US008879513B2

(12) United States Patent
Nam et al.

(10) Patent No.: US 8,879,513 B2
(45) Date of Patent: Nov. 4, 2014

(54) UPLINK TRANSMISSION APPARATUS AND METHOD FOR MOBILE COMMUNICATION SYSTEM SUPPORTING UPLINK MIMO

(75) Inventors: Young-Han Nam, Richardson, TX (US); Jianzhong Zhang, Plano, TX (US); Myunghoon Yeon, Yongin-si (KR); Jin-Kyu Han, Seoul (KR); Juho Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 361 days.

(21) Appl. No.: 13/103,188

(22) Filed: May 9, 2011

(65) Prior Publication Data

US 2011/0280222 A1 Nov. 17, 2011

Related U.S. Application Data

(60) Provisional application No. 61/334,085, filed on May 12, 2010.

(30) Foreign Application Priority Data

May 13, 2010 (KR) ........................ 10-2010-0045141

(51) Int. Cl.
*H04B 7/216* (2006.01)
*H04L 1/00* (2006.01)
*H04W 28/04* (2009.01)
*H04L 1/18* (2006.01)
*H04L 1/08* (2006.01)
*H04W 88/08* (2009.01)
*H04L 27/26* (2006.01)
*H04L 1/16* (2006.01)
*H04L 1/06* (2006.01)

(52) U.S. Cl.
CPC ............ *H04L 1/0031* (2013.01); *H04L 1/0083* (2013.01); *H04L 1/0071* (2013.01); *H04W 28/04* (2013.01); *H04L 1/1812* (2013.01); *H04L 1/08* (2013.01); *H04W 88/08* (2013.01); *H04L 27/2636* (2013.01); *H04L 1/1607* (2013.01); *H04L 1/06* (2013.01); *H04L 1/0073* (2013.01)
USPC ....................................................... 370/335

(58) Field of Classification Search
USPC ....................................................... 370/335
See application file for complete search history.

(56) References Cited

U.S. PATENT DOCUMENTS 8,274,940 B2 9/2012 Ishii et al.
8,369,884 B2 2/2013 Ishii et al.
(Continued)

OTHER PUBLICATIONS

International Search Report dated Dec. 21, 2011 in connection with International Patent Application No. PCT/KR2011/003496.

(Continued)

Primary Examiner — Huy D Vu
Assistant Examiner — Kevin Cunningham

(57) ABSTRACT

A base station includes a transmit path circuitry to transmit an uplink grant to a subscriber station. The uplink grant indicating a first MCS value for a first codeword transmission and a second MCS value for a second codeword transmission. The base station also includes a receive path circuitry configured to receive a MIMO uplink subframe from the subscriber station, the MIMO uplink subframe having a first subset of layers used for the first codeword transmission and a second subset of layers used for the second codeword transmission. ACK/NACK information and RI information are repeated on both the first and second subsets of layers, and CQI is spatially multiplexed on either the first subset or the second subset of layers. If the first MCS value is different from the second MCS value, the CQI is spatially multiplexed onto the subset of layers having a higher MCS value.

20 Claims, 12 Drawing Sheets

(56) References Cited

U.S. PATENT DOCUMENTS

| | | |
|---|---|---|
| 8,520,572 B2 | 8/2013 | Brown et al. |
| 8,625,554 B2 | 1/2014 | Zhang et al. |
| 2005/0258896 A1 | 11/2005 | Bardsley et al. |
| 2007/0194848 A1 | 8/2007 | Bardsley et al. |
| 2009/0116570 A1 | 5/2009 | Bala et al. |
| 2009/0241004 A1 | 9/2009 | Ahn et al. |
| 2009/0245195 A1 | 10/2009 | Bhattad et al. |
| 2009/0262695 A1 | 10/2009 | Chen et al. |
| 2009/0316626 A1 | 12/2009 | Lee et al. |
| 2010/0034152 A1 | 2/2010 | Imamura |
| 2010/0202561 A1* | 8/2010 | Gorokhov et al. ............ 375/295 |
| 2010/0208629 A1 | 8/2010 | Ahn et al. |
| 2010/0239040 A1* | 9/2010 | Beluri et al. ................. 375/267 |
| 2011/0103498 A1* | 5/2011 | Chen et al. ................... 375/260 |
| 2011/0134774 A1 | 6/2011 | Pelletier et al. |
| 2011/0268080 A1 | 11/2011 | Luo et al. |
| 2011/0280222 A1 | 11/2011 | Nam et al. |
| 2012/0014242 A1* | 1/2012 | Kim et al. .................... 370/203 |
| 2012/0039291 A1* | 2/2012 | Kwon et al. .................. 370/329 |
| 2013/0021898 A1 | 1/2013 | Kang et al. |
| 2013/0058305 A1 | 3/2013 | Jang et al. |
| 2013/0114461 A1 | 5/2013 | Seo et al. |

OTHER PUBLICATIONS

Written Opinion of the International Searching Authority dated Nov. 24, 2011 in connection with International Patent Application No. PCT/KR2011/002661.

International Search Report dated Nov. 24, 2011 in connection with International Patent Application No. PCT/KR2011/002661.

Office Action dated May 23, 2013 in connection with U.S. Appl. No. 13/071,284.

Notice of Allowance dated Oct. 30, 2013 in connection with U.S. Appl. No. 13/071,284.

U.S. Office Action dated Aug. 1, 2014 in connection with U.S. Appl. No. 14/188,219.

* cited by examiner

PRIOR ART

FIG. 2

UL CHANNEL INTERLEAVER 201

| 1 | 3 | 5 | 7 | 9 | 11 | 13 | 15 | 17 | 19 | 21 | 23 |
|---|---|---|---|---|---|---|---|---|---|---|---|
| 2 | 4 | 6 | 8 | 10 | 12 | 14 | 16 | 18 | 20 | 22 | 24 |
| 25 | 27 | 29 | 31 | 33 | 35 | 37 | 39 | 41 | 43 | 45 | 47 |
| 26 | 28 | 30 | 32 | 34 | 36 | 38 | 40 | 42 | 44 | 46 | 48 |
| 49 | 51 | 53 | 55 | 57 | 59 | 61 | 63 | 65 | 67 | 69 | 71 |
| 50 | 52 | 54 | 56 | 58 | 60 | 62 | 64 | 66 | 68 | 70 | 72 |
| 73 | 75 | 77 | 79 | 81 | 83 | 85 | 87 | 89 | 91 | 93 | 95 |
| 74 | 76 | 78 | 80 | 82 | 84 | 86 | 88 | 90 | 92 | 94 | 96 |
| 97 | 99 | 101 | 103 | 105 | 107 | 109 | 111 | 113 | 115 | 117 | 119 |
| 98 | 100 | 102 | 104 | 106 | 108 | 110 | 112 | 114 | 116 | 118 | 120 |
| 121 | 123 | 125 | 127 | 129 | 131 | 133 | 135 | 137 | 139 | 141 | 143 |
| 122 | 124 | 126 | 128 | 130 | 132 | 134 | 136 | 138 | 140 | 142 | 144 |
| 145 | r9 | 147 | 149 | r15 | 151 | 153 | r13 | 155 | 157 | r11 | 159 |
| 146 | r10 | 148 | 150 | r16 | 152 | 154 | r14 | 156 | 158 | r12 | 160 |
| 161 | r1 | 163 | 165 | r7 | 167 | 169 | r5 | 171 | 173 | r3 | 175 |
| 162 | r2 | 164 | 166 | r8 | 168 | 170 | r6 | 172 | 174 | r4 | 176 |

| 1 | 3 | 5 | 7 | 9 | 11 | 13 | 15 | 17 | 19 | 21 | 23 |
|---|---|---|---|---|---|---|---|---|---|---|---|
| 2 | 4 | 6 | 8 | 10 | 12 | 14 | 16 | 18 | 20 | 22 | 24 |
| 25 | 27 | 29 | 31 | 33 | 35 | 37 | 39 | 41 | 43 | 45 | 47 |
| 26 | 28 | 30 | 32 | 34 | 36 | 38 | 40 | 42 | 44 | 46 | 48 |
| 49 | 51 | 53 | 55 | 57 | 59 | 61 | 63 | 65 | 67 | 69 | 71 |
| 50 | 52 | 54 | 56 | 58 | 60 | 62 | 64 | 66 | 68 | 70 | 72 |
| 73 | 75 | 77 | 79 | 81 | 83 | 85 | 87 | 89 | 91 | 93 | 95 |
| 74 | 76 | 78 | 80 | 82 | 84 | 86 | 88 | 90 | 92 | 94 | 96 |
| 97 | 99 | 101 | 103 | 105 | 107 | 109 | 111 | 113 | 115 | 117 | 119 |
| 98 | 100 | 102 | 104 | 106 | 108 | 110 | 112 | 114 | 116 | 118 | 120 |
| 121 | 123 | 125 | 127 | 129 | 131 | 133 | 135 | 137 | 139 | 141 | 143 |
| 122 | 124 | 126 | 128 | 130 | 132 | 134 | 136 | 138 | 140 | 142 | 144 |
| 145 | r9 | 147 | 149 | r15 | 151 | 153 | r13 | 155 | 157 | r11 | 159 |
| 146 | r10 | 148 | 150 | r16 | 152 | 154 | r14 | 156 | 158 | r12 | 160 |
| 161 | r1 | 163 | 165 | r7 | 167 | 169 | r5 | 171 | 173 | r3 | 175 |
| 162 | r2 | 164 | 166 | r8 | 168 | 170 | r6 | 172 | 174 | r4 | 176 |

☐ CODED SYMBOL OF CQI
▤ CODED SYMBOL OF CODEBLOCK 0
▨ CODED SYMBOL OF CODEBLOCK 1
☰ CODED SYMBOL OF RI
⊠ CODED SYMBOL OF ACK

202 LAYER NUMBER 1

UPLINK TRANSMISSION APPARATUS AND METHOD FOR MOBILE COMMUNICATION SYSTEM SUPPORTING UPLINK MIMO

CROSS-REFERENCE TO RELATED APPLICATION(S) AND CLAIM OF PRIORITY

The present application is related to U.S. Provisional Patent Application No. 61/334,085, filed May 12, 2010, entitled "MULTIPLEXING OF CONTROL AND DATA IN AN UPLINK MIMO SYSTEM". Provisional Patent Application No. 61/334,085 is assigned to the assignee of the present application and is hereby incorporated by reference into the present application as if fully set forth herein. The present application hereby claims priority under 35 U.S.C. §119(e) to U.S. Provisional Patent Application No. 61/334,085.

The present application also claims priority under 35 U.S.C. §119(a) to a Korean Patent Application entitled "UPLINK TRANSMISSION APPARATUS AND METHOD FOR MOBILE COMMUNICATION SYSTEM SUPPORTING UPLINK MIMO" filed in the Korean Intellectual Property Office on May 13, 2010 and assigned Serial No. 10-2010-0045141, the contents of which are incorporated herein by reference.

TECHNICAL FIELD OF THE INVENTION

This disclosure relates to uplink transmission apparatus and method for mobile communication system supporting uplink MIMO.

BACKGROUND OF THE INVENTION

In the uplink of Long Term Evolution (LTE) as a next generation mobile communication standard, just one codeword is transmitted through an antenna. The physical uplink shared channel (PUSCH) is used for the uplink data transmission in such a system, and the Uplink Control Information (UCI) including channel quality indicator (CQI), rank indicator (RI), and hybrid automatic repeat request—acknowledgement (HARQ-ACK) is carried in the same PUSCH transmitted for the uplink data.

FIG. 1 is a diagram illustrating a procedure for processing data and UCI in the uplink of a legacy LTE system on the transport channel and physical channel levels. In FIG. 1, reference numbers 101 to 110 denote the steps of processing on the transport channel, and reference numbers 111 to 115 denote the steps of processing on the physical channel.

In the uplink of the legacy LTE system, a User Equipment (UE) uses a single codeword and a single antenna such that, when the PUSCH and UCI are transmitted together, the UCI is mapped to a single codeword and then transmitted on a single layer.

Referring to FIG. 1, the UE determines a number of coded symbols for the transmission of ACK or RI, i.e., the number of symbols for RI (channel coding RI) at step 107 and the number of symbols for ACK (channel coding ACK/NACK) at step 108. The UE also determines the number of coded symbols for transmitting CQI in the PUSCH, i.e., the number of symbols for CQI (channel coding CQI) at step 106.

The UE attaches a Cyclic Redundancy Check (CRC) to the Transport Block (TB) at step 101 and segments the TB into code blocks and attaches the CRC to each code block again at step 102. Next, the UE performs channel coding at step 103, rate matching at step 104, and then concatenates the code blocks (channel block concatenation) at step 105. Next, the UE multiplexes data (UL-SCH data) and CQI information (data and control multiplexing) at step 109.

Next, the UE performs interleaving (channel interleaving) on the data uplink shared channel (UL-SCH) data, CQI, RI, and ACK/NACK information (that are processed at steps 109, 107, and 108) at step 110.

FIG. 2 is a diagram illustrating uplink (UL) channel interleaver-layer mapping relationship in the legacy LTE system. In FIG. 2, reference number 201 denotes an exemplary symbol configuration of the UL channel interleaver, and reference number 202 denotes an exemplary symbol configuration of layer#1. Referring to FIG. 2, the output bit sequence of the channel interleaver as denoted by reference number 201 is mapped one by one onto the layer#1 as denoted by reference number 202.

The channel interleaved information is scrambled at step 111, modulated (modulation mapper) at step 112, transformed by discrete Fourier transform (DFT) (transform precoder, DFT) at step 113, mapped to resource (resource element mapper) at step 114, and then transformed by inverse fast Fourier transform (IFFF) for transmission at step 115.

In the LTE system, the UE uses a single codeword and a single antenna for uplink transmission as described above such that, when the data and UCI are transmitted together in the PUSCH, the UCI is transmitted on the signal layer as mapped to the single codeword.

Unlike the legacy LTE system, the UE can use two codewords and up to four transmit antennas in LTE-Advanced (LTE-A) system. Accordingly, when the data and UCI are transmitted together through UL-SCH, the UCI can be mapped to one or two codewords. This means that the UE can transmit the UCI on multiple layers in the uplink of the LTE-A system.

However, in the case in which the transmitted UCI is unequally distributed on the two layers, if the channel status is good for one layer but bad for the other, the UCI reception performance is likely degraded especially when such control information is concentrated onto the layer having bad channel status.

SUMMARY OF THE INVENTION

In order to solve the problems of prior arts, this disclosure provides a method for transmitting the information of CQI, RI, HARQ-ACK constituting the UCI as equally distributed on multiple layers especially when a single codeword is mapped to two transmission layers.

Also, this disclosure provides a method for transmitting the UCI carried with a single codeword mapped to two layers and two codewords mapped to multiple layers in an uplink channel of a LTE-A system supporting multi-antenna transmission.

This disclosure provides a method for transmitting the UCI carried with a single codeword as equally distributed on two layers. For this purpose, first an uplink interleaving operation taking into consideration the number of layers to which the codeword is mapped is disclosed. Unlike the conventional uplink channel interleaver designed to consider the time and frequency, the uplink channel interleaver of this disclosure is designed to operate by taking into consideration the number of layers as well as the time and frequency. This disclosure also discloses some modification necessary for data and UCI processing procedure on the transport layer and physical layer according to the disclosed uplink channel interleaver. Second, a method for transmitting the UCI with interleavers for respective layers, when a single codeword is transmitted on two layers, is disclosed. Also, this disclosure discloses some modifications necessary for processing the data and UCI on the transport layer and the physical layer in case each layer has a dedicated uplink channel interleaver.

This disclosure discloses a method for transmitting the UCI on multiple layers especially when two codewords are mapped to multiple layers.

In accordance with an aspect of this disclosure, an uplink data multiplexing method for a mobile communication system includes receiving multiplexed data of data and CQI, RI, and ACK; channel-interleaving the multiplexed data, RI, and ACK; modulating the channel interleaved data into a codeword composed of a plurality of symbols; and mapping a sequence of odd number-th symbols to a first layer and a sequence of even number-th symbols to a second layer.

In accordance with another aspect of this disclosure, an uplink data multiplexing method for a mobile communication system includes receiving data obtained by multiplexing data and CQI, RI, and ACK; channel-interleaving the multiplexed data, RI, and ACK to be equally distributed on individual layers by taking into consideration a number of layers; modulating the channel-interleaved data into codewords composed of a plurality of symbols; and mapping a sequence of odd number-th symbols to a first layer and a sequence of even number-th symbols to a second layer.

In accordance with another aspect of this disclosure, an uplink data multiplexing method of a mobile communication system includes receiving data obtained by multiplexing data and CQI, RI, and ACK; channel-interleaving the multiplexed data, RI, and ACK to be equally distributed on individual layers in consideration of a number of layers for a first codeword; channel-interleaving the multiplexed data, RI, and ACK to be equally distributed on individual layers in consideration of a number of layers for a second codeword; modulating the interleaved data into codewords composed of a plurality of symbols; mapping a sequence of odd number-th symbols of the modulated first codeword to a first layer; mapping a sequence of even number-th symbols of the modulated first codeword to a second layer; mapping a sequence of odd number-th symbols of the modulated second codeword to a third layer; and mapping a sequence of even number-th symbols of the modulated second codeword to a fourth layer.

In accordance with another aspect of this disclosure, an uplink data multiplexing method of a mobile communication system includes time division-multiplexing, when two codewords are being transmitted, ACK and RI symbols with data to be repeated on all layers and transmitted in a time-aligned manner; channel-interleaving for CQI to be transmitted on layers mapped to a codeword; modulating the channel-interleaved data into codewords composed of a plurality of symbols; and mapping the modulated codewords to corresponding layers.

In accordance with still another aspect of this disclosure, an uplink data multiplexing apparatus of a mobile communication system includes a multiplexer for multiplexing channel-coded data and CQI, a RI channel coder for channel-coding RI data, an ACK channel coder for channel-coding ACK, a channel interleaver for channel interleaving the multiplexed data, RI, and ACK, a modulator for modulating the channel-interleaved data into codewords composed of a plurality of symbols, and a layer mapper for mapping a sequence of odd number-th symbols of the modulated codewords to a first layer and mapping a sequence of even number-th symbols of the modulated codewords to a second layer.

A base station is provided. The base station comprising a transmit path circuitry configured to transmit an uplink grant to a subscriber station. The uplink grant indicating a first modulation and coding scheme (MCS) value for a first codeword transmission and a second MCS value for a second codeword transmission. The base station also includes a receive path circuitry configured to receive a multiple-input multiple-output (MIMO) uplink subframe from the subscriber station, the MIMO uplink subframe having a first subset of layers used for the first codeword transmission and a second subset of layers used for the second codeword transmission. Acknowledgement/negative acknowledgement (ACK/NACK) information and rank indication (RI) information are repeated on both the first subset of layers and the second subset of layers. Channel quality information (CQI) is spatially multiplexed on either the first subset of layers or the second subset of layers. If the first MCS value is different from the second MCS value, the CQI is spatially multiplexed onto the subset of layers having a higher MCS value. If the first MCS value is the same as the second MCS value, the CQI is spatially multiplexed onto the first subset of layers.

A method of operating a base station is provided. The method includes transmitting an uplink grant to a subscriber station, the uplink grant indicating a first modulation and coding scheme (MCS) value for a first codeword transmission and a second MCS value for a second codeword transmission. The method also includes receiving a multiple-input multiple-output (MIMO) uplink subframe from the subscriber station, the MIMO uplink subframe having a first subset of layers used for the first codeword transmission and a second subset of layers used for the second codeword transmission. Acknowledgement/negative acknowledgement (ACK/NACK) information and rank indication (RI) information are repeated on both the first subset of layers and the second subset of layers. Channel quality information (CQI) is spatially multiplexed on either the first subset of layers or the second subset of layers. If the first MCS value is different from the second MCS value, the CQI is spatially multiplexed onto the subset of layers having a higher MCS value. If the first MCS value is the same as the second MCS value, the CQI is spatially multiplexed onto the first subset of layers.

A subscriber station is provided. The subscriber station includes a receive path circuitry configured to receive an uplink grant from a base station, the uplink grant indicating a first modulation and coding scheme (MCS) value for a first codeword transmission and a second MCS value for a second codeword transmission. The subscriber station also includes a transmit path circuitry configured to transmit a multiple-input multiple-output (MIMO) uplink subframe from the subscriber station, the MIMO uplink subframe having a first subset of layers used for the first codeword transmission and a second subset of layers used for the second codeword transmission. Acknowledgement/negative acknowledgement (ACK/NACK) information and rank indication (RI) information are repeated on both the first subset of layers and the second subset of layers. Channel quality information (CQI) is spatially multiplexed on either the first subset of layers or the second subset of layers. If the first MCS value is different from the second MCS value, the CQI is spatially multiplexed onto the subset of layers having a higher MCS value. If the first MCS value is the same as the second MCS value, the CQI is spatially multiplexed onto the first subset of layers.

A method of operating a subscriber station is provided. The method includes receiving an uplink grant from a base station, the uplink grant indicating a first modulation and coding scheme (MCS) value for a first codeword transmission and a second MCS value for a second codeword transmission. The method also includes transmitting a multiple-input multiple-output (MIMO) uplink subframe from the subscriber station, the MIMO uplink subframe having a first subset of layers used for the first codeword transmission and a second subset of layers used for the second codeword transmission. Acknowledgement/negative acknowledgement (ACK/NACK) information and rank indication (RI) information are repeated on both the first subset of layers and the second subset of layers. Channel quality information (CQI) is spatially multiplexed on either the first subset of layers or the second subset of layers. If the first MCS value is different from the second MCS value, the CQI is spatially multiplexed onto the subset of layers having a higher MCS value. If the first MCS value is the same as the second MCS value, the CQI is spatially multiplexed onto the first subset of layers.

A base station is provided. The base station includes a receive path circuitry configured to receive a multiple-input multiple-output (MIMO) uplink subframe from a subscriber station, the MIMO uplink subframe having a first subset of layers having a total number of layers $L_1$ used for a first codeword transmission carrying acknowledgement/negative acknowledgement (ACK/NACK) information and rank indication (RI) information, and a second subset of layers having a total number of layers $L_2$ used for a second codeword transmission carrying ACK/NACK information, RI information, and channel quality information (CQI). A total number of coded symbols $N_{ACK}$ used for carrying ACK/NACK information is generated by repeating $N_{ACK}/(L_1+L_2)$ coded symbols across each of the $L_1$ and $L_2$ layers. A total number of coded symbols $N_{RI}$ used for carrying RI information is generated by repeating $N_{RI}/(L_1+L_2)$ coded symbols across each of the $L_1$ and $L_2$ layers, and a total number of coded symbols $N_{CQI}$ is used for carrying CQI and $N_{CQI}/L_2$ coded symbols are mapped across each of the $L_2$ layers.

A method of operating a base station is provided. The method includes receiving a multiple-input multiple-output (MIMO) uplink subframe from a subscriber station, the MIMO uplink subframe having a first subset of layers having a total number of layers $L_1$ used for a first codeword transmission carrying acknowledgement/negative acknowledgement (ACK/NACK) information and rank indication (RI) information, and a second subset of layers having a total number of layers $L_2$ used for a second codeword transmission carrying ACK/NACK information, RI information, and channel quality information (CQI). A total number of coded symbols $N_{ACK}$ used for carrying ACK/NACK information is generated by repeating $N_{ACK}/(L_1+L_2)$ coded symbols across each of the $L_1$ and $L_2$ layers. A total number of coded symbols $N_{RI}$ used for carrying RI information is generated by repeating Aim $N_{RI}/(L_1+L_2)$ coded symbols across each of the $L_1$ and $L_2$ layers, and a total number of coded symbols $N_{CQI}$ is used for carrying CQI and $N_{CQI}/L_2$ coded symbols are mapped across each of the $L_2$ layers.

A subscriber station is provided. The subscriber station includes a transmit path circuitry configured to transmit a multiple-input multiple-output (MIMO) uplink subframe from a subscriber station, the MIMO uplink subframe having a first subset of layers having a total number of layers $L_1$ used for a first codeword transmission carrying acknowledgement/negative acknowledgement (ACK/NACK) information and rank indication (RI) information, and a second subset of layers having a total number of layers $L_2$ used for a second codeword transmission carrying ACK/NACK information, RI information, and channel quality information (CQI). A total number of coded symbols $N_{ACK}$ used for carrying ACK/NACK information is generated by repeating $N_{ACK}/(L_1+L_2)$ coded symbols across each of the $L_1$ and $L_2$ layers. A total number of coded symbols $N_{RI}$ used for carrying RI information is generated by repeating $N_{RI}/(L_1+L_2)$ coded symbols across each of the $L_1$ and $L_2$ layers, and a total number of coded symbols $N_{CQI}$ is used for carrying CQI and $N_{CQI}/L_2$ coded symbols are mapped across each of the $L_2$ layers.

A method of operating a subscriber station is provided. The method includes transmitting a multiple-input multiple-output (MIMO) uplink subframe from a subscriber station, the MIMO uplink subframe having a first subset of layers having a total number of layers $L_1$ used for a first codeword transmission carrying acknowledgement/negative acknowledgement (ACK/NACK) information and rank indication (RI) information, and a second subset of layers having a total number of layers $L_2$ used for a second codeword transmission carrying ACK/NACK information, RI information, and channel quality information (CQI). A total number of coded symbols $N_{ACK}$ used for carrying ACK/NACK information is generated by repeating $N_{ACK}/(L_1+L_2)$ coded symbols across each of the $L_1$ and $L_2$ layers. A total number of coded symbols $N_{RI}$ used for carrying RI information is generated by repeating $N_{RI}/(L_1+L_2)$ coded symbols across each of the $L_1$ and $L_2$ layers, and a total number of coded symbols $N_{CQI}$ is used for carrying CQI and $N_{CQI}/L_2$ coded symbols are mapped across each of the $L_2$ layers.

BRIEF DESCRIPTION OF THE DRAWINGS

FIG. 2 is a diagram illustrating an uplink (UL) channel interleaver-layer mapping relationship in the legacy LTE system;

DETAILED DESCRIPTION OF THE INVENTION

Figure 1:
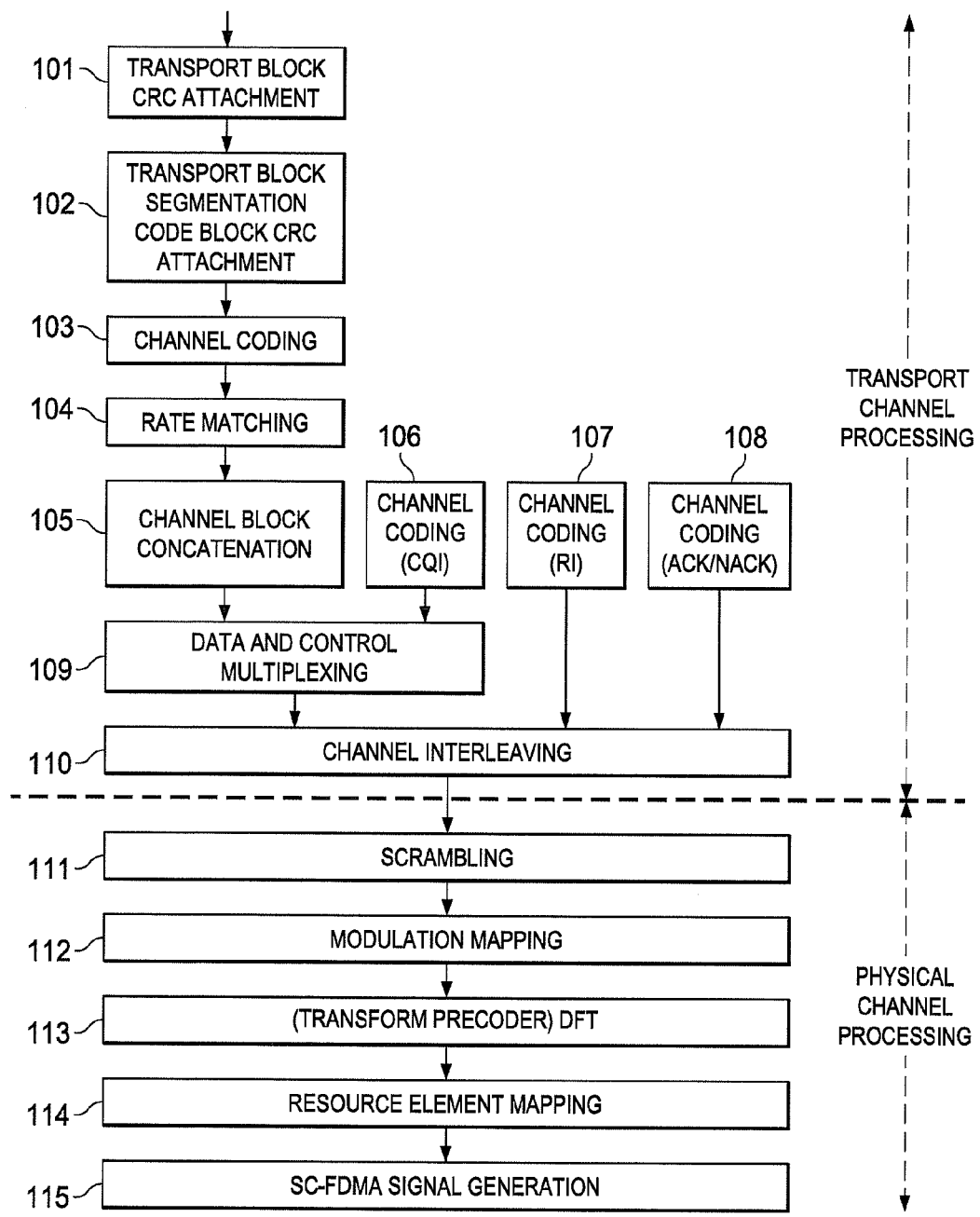
FIG. 1 is a diagram illustrating a procedure for processing data and UCI in uplink of a legacy LTE system on the transport channel and physical channel levels.

Embodiments of this disclosure are described with reference to accompanying formulas and drawings.

Although the description is directed to the 3GPP Evolved Universal Terrestrial Radio Access (EUTRA, also referred to as LTE) or Advanced E-UTRA (also referred to as LTE-A)

standards in the following, this disclosure is not limited thereto but can be applied to other communication systems based on the similar technical background and channel formats with minor modifications without departing from the scope of this disclosure as understood by those skilled in the art.

This disclosure discloses a method for transmitting the UCI carried in a codeword as mapped to two layers and UCI carried in two codewords as mapped to multiple layers in the uplink of the LTE-Advanced system supporting multiple transmit antenna.

First, a method for transmitting the UCI carried in a codeword as equally distributed on two layers is disclosed. For this purpose, an uplink channel-interleaving operation that takes into consideration a number of layers to which the codeword is mapped is disclosed. According to an embodiment of this disclosure, the uplink channel interleaver is designed to operate by taking in consideration time, frequency and the number of transmission layers. Also, some modifications are disclosed in the procedure for processing the data and UCI information of the transport layer and physical layer according to the disclosed uplink channel interleaver.

Second, a method for transmitting a single codeword on two layers with uplink channel interleavers responsible for respective transmission layers is disclosed. For the case in which each layer is provided with a dedicated uplink channel interleaver, some modifications are disclosed in the procedure for processing the data and UCI information.

This disclosure also discloses a method for transmitting UCI on multiple layers when two codewords are mapped to multiple layers.

In LTE, one codeword and one antenna are used in the uplink such that only one layer is used for transmitting the PUSCH carrying Uplink Control Information (UCI). That is, only rank-1 transmission is supported. Meanwhile, LTE-A supports up to two codewords and 4 transmit antennas such that up to 4 layers can be used for transmission. That is, rank-4 transmission is possible in the LTE-A system. In the LTE-A system supporting up to two codewords and up to four antennas, the following scenario is possible.

Rank-1 Transmission
CW0 is mapped to layer1
Rank-2 Transmission
CW0 is mapped to layer1
CW1 is mapped to layer2
Rank-3 transmission
CW0 is mapped to layer1
CW1 is mapped to layer2 and layer3
Rank-4 Transmission
CW0 is mapped to layer1 and layer2
CW1 is mapped to layer3 and layer4

In the case in which one codeword is mapped to one layer, CW0 is mapped to layer1 for rank-1 transmission, CW0 to layer1 or CW1 to layer2 for rank-2 transmission, and CW0 to layer1 for rank-3 transmission, such that the channel interleaver operation in LTE can be applied without modification.

In the case in which one codeword is mapped to two layers, CW1 is mapped to layer2 and layer3 for rank-3 transmission. CW0 is mapped to layer1 and layer2 and CW1 is mapped to layer3 and layer4 for rank-4 transmission. When one codeword is mapped to two layers, the uplink channel interleaver operates as follows.

Figure 3:
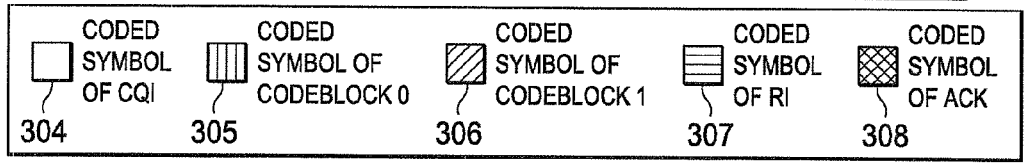
FIG. 3 is a diagram illustrating a mapping relationship between a single uplink channel interleaver and a single layer according to a first embodiment of this disclosure.

FIG. 3 is a diagram illustrating a mapping relationship between a single uplink channel interleaver and a single layer according to a first embodiment of this disclosure.

Assuming that QPSK modulation is used in FIG. 3, $Q_m=2$, and the coded symbol of RI 307 is 2-bit long.

In FIG. 3, r1, r2, r3, r4, r5, r6, r7, r8, r9, r10, r11, r12, r13, r14, r15, and r16 are indices of coded symbols of RI and arranged in the uplink channel interleaver 301.

The numbers 1 to 32 are the indices of coded symbols of CQI and arranged in the uplink channel interleaver 301 as shown in FIG. 3. Assuming QPSK modulation, the coded symbols of CQI 304 consists of two bits. In the interleaver 301 of FIG. 3, the first and second index bits constitute the first coded symbol of CQI, the third and fourth index bits constitute the second coded symbol of CQI, and so on until the 31st and 32nd index bits constitute the 16th coded symbol.

In FIG. 3, numbers 33 to 96 are index bits constituting a coded codeblock0 and arranged as shown in the uplink channel interleaver 301, and numbers 97 to 176 are index bits constituting a coded codeblock1. Since QPSK is assumed in FIG. 3, the coded symbol 305 of codeblock0 consists of two bits. Also, the coded symbol 306 of codeblock1 consists of two bits.

In FIG. 3, the index bits of 147, 148, 149, 150, 155, 156, 157, 158, 163, 164, 165, 166, 171, 172, 173, and 174 constituting the code block are overlaid by coded ACK bits. Since QPSK modulation is assumed in FIG. 3, the coded symbol 308 of ACK consist of two bits. The positions of the index bits that are sequentially mapped to the coded ACK bits are indicated by 163, 164, 173, 174, 171, 172, 165, 166, 147, 148, 157, 158, 155, 156, 149, and 150.

In the case in which the channel interleaver 301 of FIG. 3 is used without modification, one codeword can be mapped to two layers as follows. The uplink channel interleaver 301 of FIG. 3 reads out data downward from the first column in unit of symbol. After all of the symbols of the first column are read out completely, the symbols of the second column are read. In the first embodiment, $Q_m=2$ and the symbols in the uplink channel interleaver 301 have to be mapped to the two layers (Layer#1 and Layer#2) as denoted by reference numbers 302 and 303 such that, if mapping starts from the first column, the CQI symbol composed of the bits located at the positions indicated by 1 and 2 in the uplink channel interleaver 301 is scrambled first, modulated to a modulation symbol by the modulation mapper, and then mapped to the layer#1 at first. The CQI symbol composed of bits located at the positions indicated by 25 and 26 in the uplink channel interleaver 301 is scrambled first, modulated to a modulation symbol by the modulation mapper, and then mapped to the layer#2 303 at first. In FIG. 3, the symbols on layer#1 and layer#2 should be expressed as modulation symbols. For example, when $Q_m=2$, the QPSK modulation mapping is expressed by $$\frac{1}{\sqrt{2}} + \frac{1}{\sqrt{2}}j$$

for 00 (bits of the symbol), $$\frac{1}{\sqrt{2}} - \frac{1}{\sqrt{2}}j$$

for 01, $$-\frac{1}{\sqrt{2}} + \frac{1}{\sqrt{2}}j$$

for 10, and $$-\frac{1}{\sqrt{2}} - \frac{1}{\sqrt{2}} j$$

for 11.

In this embodiment, however, the bit indices generated by the uplink channel interleaver 301 are used in place of the modulation symbols in order to explain how the indices are mapped to the layers.

The symbol of the codeblock0 which is composed of the bits located at the index positions 49 and 50 of the uplink channel interleaver 301 is mapped to layer#1 302, and the symbol of the codeblock0 which is composed of the bits located at the index positions 73 and 74 is mapped to Layer#2 303. The symbol of the codeblock1 which is composed of the bits located at the index positions 97 and 98 is mapped to the layer#1 302, and the symbol of the codeblock1 which is composed of the bits located at the index positions 121 and 122 is mapped to the layer#2 303. The symbol of the codeblock1 which is composed of the bits located at the index positions 145 and 146 is mapped to the layer#1 302, and the symbol of the codeblock1 which is composed of the bits located at the index positions 161 and 162 is mapped to the layer#2 303. After mapping the symbols of the first column of the uplink channel interleaver 301 to the layer#1 302 and the layer#2 303, the data of the second column of the uplink channel interleaver 301 are mapped to the layer#1 302 and the layer#2 303 as follows. The CQI symbol composed of the bits located at the index positions 3 and 4 is mapped to layer#1 302, and the CQI symbol composed of the bits located at the index positions 27 and 28 is mapped to layer#2 303. Next, the symbol of codeblock0 which is composed of the bits located at the index positions 51 and 52 is mapped to Layer#1 302, and the symbol of codeblock0 which is composed of the bits located at the index positions 75 and 76 is mapped to layer#2 303. The symbol of codeblock1 which is composed of the bits located at the index positions 99 and 100 is mapped to Layer#1 302, and the symbol of codeblock1 which is composed of the bits located at the index positions 123 and 124 is mapped to layer#2 303. The RI symbol composed of the bits located at the positions r9 and r10 is mapped to layer#1 302, and the RI symbol composed of the bits located at the positions r1 and r2 is mapped to layer#2 303. If the symbols of the interleaver 301 are mapped to the layer#1 302 and layer#2 303 as described above, the CQI bits are unequally distributed on layer#1 302 and layer#2 303. As shown in FIG. 3, the CQI symbols are mapped to the bit positions 1 to 24 on layer#1 and the bit positions 25 to 32 on layer#2.

In order to solve the unequal distribution problem of the first embodiment in which the coded CQI symbols are distributed to layer#1 and layer#2 unequally, a second embodiment of this disclosure discloses a method of writing data to the uplink channel interleaver that takes into consideration the number of transmission layers.

Figure 4:
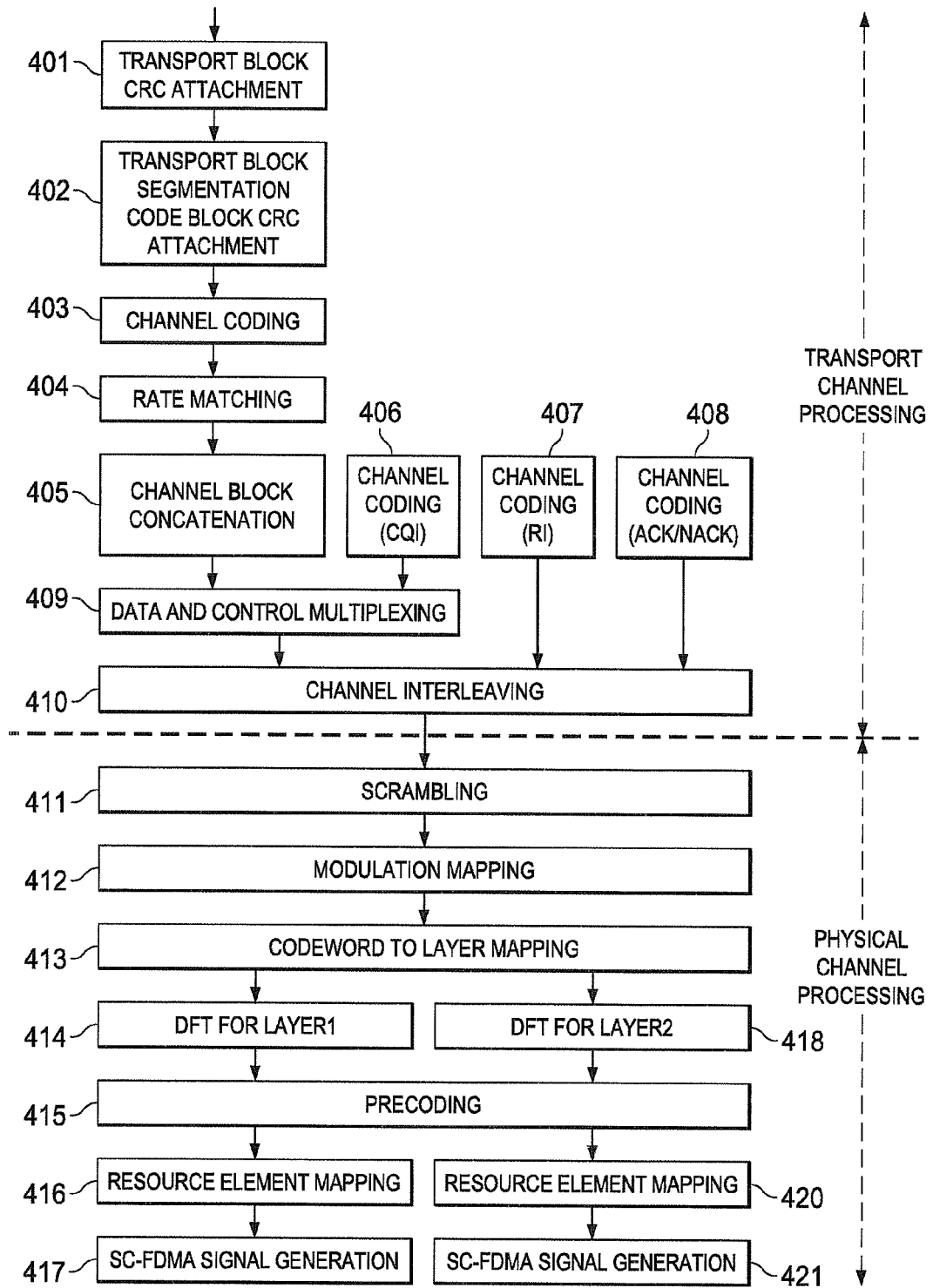
FIG. 4 is a diagram illustrating a procedure of a transmitter processing data and UCI on the transport and physical channels according to a second embodiment of this disclosure.

FIG. 4 is a diagram illustrating a procedure of a transmitter processing data and UCI on the transport and physical channels according to the second embodiment of this disclosure.

A description can be made with equations as follows. At steps 407 and 408 of FIG. 4, the UE determines a number of coded symbols $Q'$ with Equation 1 for RI or ACK transmission. In Equation 1, O is a number of bits of the ACK or RI, and the parameters are defined as shown in Table 1.

$$Q' = \min\left(\left\lceil \frac{O \cdot M_{SC}^{PUSCH-initial} \cdot N_{SYMB}^{PUSCH-initial} \cdot \beta_{OFFSET}^{PUSCH}}{\sum_{r=0}^{C-1} K_r} \right\rceil, 4M_{SC}^{PUSCH}\right).$$ [Eqn. 1]

TABLE 1 definitions of parameters used in Equation 1

| | |
|---|---|
| $M_{SC}^{PUSCH\text{-}initial}$ | The number of ACK/NACK, or RI, Initially scheduled bandwidth for the same TB, expressed as number of subcarriers |
| $M_{SC}^{PUSCH}$ | scheduled bandwidth for the current PUSCH in the unit of subcarrier |
| C | number of codeblocks for the TB |
| $K_r$ | number of bits for code block number r |
| $\beta_{OFFSET}^{PUSCH}$ | offsets configured by higher layers |
| $N_{SYMB}^{PUSCH\text{-}initial}$ | number of SC-FDMA symbols in the subframe for initial PUSCH transmission |
| $N_{SYMB}$ | number of SC-FDMA symbols in the current PUSCH transmission subframes |

A number of total coded HARQ-ACK bits is calculated by Equation 2 where $Q_{ACK}$ denotes the number of total bits of the coded ACK, $Q_m$ denotes a number of bits per symbol (2 for QPSK, 4 for 16QAM, and 6 for 64QAM). N denotes a number of layers to which one codeword is mapped.

$$Q_{ACK} = Q_m \cdot Q_{ACK}' \cdot N.$$ [Eqn. 2]

For example, when $Q_{ACK}'=4$, $Q_m=2$, and N=2; $Q_{ACK}$ is 16. Since $Q_{ACK}$ is 16, $q_0^{ACK}, q_1^{ACK}, \ldots, q_{Q_{ACK}-1}$ is generated by concatenating the coded values of Table 3 and can be expressed by Equation 3.

$$q_0^{ACK}, q_1^{ACK}, \ldots, q_{Q_{ACK}-1}^{ACK} = [o_0^{ACK} o_1^{ACK} o_2^{ACK} o_0^{ACK} o_1^{ACK} o_2^{ACK} o_0^{ACK} o_1^{ACK} o_2^{ACK} o_0^{ACK} o_1^{ACK} o_2^{ACK} o_0^{ACK}].$$ [Eqn 3]

TABLE 2 encoding of 1-bit HARQ-ACK

| $Q_m$ | Encoded HARQ-ACK |
|---|---|
| 2 | $[o_0^{ACK} y]$ |
| 4 | $[o_0^{ACK} y\ x\ x]$ |
| 6 | $[o_0^{ACK} y\ x\ x\ x\ x]$ |

TABLE 3 encoding of 2-bit HARQ-ACK

| $Q_m$ | Encoded HARQ-ACK |
|---|---|
| 2 | $[o_0^{ACK} o_1^{ACK} o_2^{ACK} o_0^{ACK} o_1^{ACK} o_2^{ACK}]$ |
| 4 | $[o_0^{ACK} o_1^{ACK} x\ x\ o_2^{ACK} o_0^{ACK} o_1^{ACK} o_2^{ACK} x\ x]$ |
| 6 | $[o_0^{ACK} o_1^{ACK} x\ x\ x\ x\ o_2^{ACK} o_0^{ACK} o_1^{ACK} x\ x\ x\ x\ o_1^{ACK} o_2^{ACK} x\ x\ x\ x]$ |

The vector sequence output of the channel coding of ACK information value can be expressed by Equation 4. Here, $Q_{ACK}' = Q_{ACK}/Q_m/N$, and it is processed according to Equation 5a.

$$q_0^{ACK}, q_1^{ACK}, \ldots, q_{Q'_{ACK}-1}^{ACK}.$$ [Eqn. 4]

Set i, k to 0 [Eqn. 5a]
while i < $Q_{ACK}$
$\underline{q_k^{ACK}} = [q_i^{ACK} \ldots q_{i+Q_m \cdot N-1}^{ACK}]^T$ -continued

```
i = i + Q_m · N
k = k + 1
end while
```

In some embodiments, it is processed according to Equation 5b as follows:

```
set i, k to 0                                                [Eqn. 5b]
while i < Q_ACK
    if N = 1,
        q_k^ACK = [q_i^ACK ... q_{i+Q_m-1}^ACK]^T
    elseif N = 2,
        q_k^ACK = [q_i^ACK ... q_{i+Q_m-1}^ACK q_i^ACK ... q_{i+Q_m-1}^ACK]^T
    end if
    i = i + Q_m · N
    k = k + 1
end while
```

In order to indicate the number of total RI bits, Equation 6 is used at step 407 of FIG. 4, where $Q_{RI}$ denotes a number of total coded RI bits, and $Q_m$ denotes a number of bits per modulation symbol (2 for QPSK, 4 for 16QAM, and 6 for 64QAM). N denotes a number of layers to which one codeword is mapped.

$$Q_{RI} = Q_m \cdot Q_{RI}' \cdot N \quad \text{[Eqn. 6]}$$

For example, when $Q_{RI}'=4$, $Q_m=2$, and $N=2$, $Q_{RI}$ is 16. Since $Q_{ACK}$ is 16, $q_0^{RI}, q_1^{RI}, \ldots, q_{Q_{RI}-1}^{RI}$ is generated by concatenating the coded values of table 5 and can be expressed by Equation 7. In case that the maximum rank of RI is 2, the encoded values of table 4 are used.

$$q_0^{RI}, q_1^{RI}, \ldots, q_{Q_{RI}-1}^{RI} = [o_0^{RI}\, o_1^{RI}\, o_2^{RI}\, o_0^{RI}\, o_1^{RI}\, o_2^{RI}\, o_0^{RI}\, o_1^{RI}\, o_2^{RI}\, o_0^{RI}\, o_1^{RI}\, o_2^{RI}\, o_0^{RI}\, o_1^{RI}\, o_2^{RI}\, o_0^{RI}] \quad \text{[Eqn. 7]}$$

TABLE 4

| $Q_m$ | Encoded RI |
|---|---|
| 2 | [$o_0^{RI}$ y] |
| 4 | [$o_0^{RI}$ y x x] |
| 6 | [$o_0^{RI}$ y x x x x] |

TABLE 5

| $Q_m$ | Encoded RI |
|---|---|
| 2 | [$o_0^{RI}\, o_1^{RI}\, o_2^{RI}\, o_0^{RI}\, o_1^{RI}\, o_2^{RI}$] |
| 4 | [$o_0^{RI}\, o_1^{RI}$ x x $o_2^{RI}\, o_0^{RI}$ x x $o_1^{RI}\, o_2^{RI}$ x x] |
| 6 | [$o_0^{RI}\, o_1^{RI}$ x x x x $o_2^{RI}\, o_0^{RI}$ x x x x $o_1^{RI}\, o_2^{RI}$ x x x x] |

The vector sequence output of the channel coding of RI information value can be expressed by Equation 8. Here, $Q_{RI}'=Q_{RI}/Q_m/N$ and is processed according to Equation 9a. Equation 9a, a number of layers is taken into account.

$$q_0^{RI}, q_1^{RI}, \ldots, q_{Q_{RI}-1}^{RI}. \quad \text{[Eqn. 8]}$$

```
Set i, k to 0                                                [Eqn. 9a]
while i < Q_RI
    q_k^RI = [q_i^RI ... q_{i+Q_m·N-1}^RI]^T
    i = i + Q_m · N
    k = k + 1
end while
```

In some embodiments, $Q_{RI}'=Q_{RI}/Q_m/N$ and is processed according to Equation 9b as follows:

```
set i, k to 0                                                [Eqn. 9b]
while i < Q_RI
    if N = 1,
        q_k^RI = [q_i^RI ... q_{i+Q_m-1}^RI]^T
    elseif N = 2,
        q_k^RI = [q_i^RI ... q_{i+Q_m-1}^RI q_i^RI ... q_{i+Q_m-1}^RI]^T
    end if
    i = i + Q_m · N
    k = k + 1
end while
```

At step 406 of FIG. 4, the UE determines the number of coded symbols Q' using Equation 10 for CQI transmission. Here, O denotes a number of bits of CQI, $M_{SC}^{PUSCH}$ denotes the bandwidth scheduled for PUSCH transmission in the current subframe and expressed as number of subcarriers. $N_{SYMB}^{PUSCH-initial}$ is a number of SC-FDMA symbols per subframe used in initial transmission. The parameters are defined as shown in Table 6.

$$Q' = \min\left(\left\lceil \frac{(O+L) \cdot M_{SC}^{PUSCH-initial} \cdot N_{SYMB}^{PUSCH-initial} \cdot \beta_{OFFSET}^{PUSCH}}{\sum_{r=0}^{C-1} K_r} \right\rceil, \right. \quad \text{[Eqn. 10]}$$

$$\left. M_{SC}^{PUSCH} \cdot N_{SYMB}^{PUSCH} - \frac{Q_{RI}}{Q_m \cdot N} \right)$$

TABLE 6

| | |
|---|---|
| O | number of CQI bits |
| $M_{SC}^{PUSCH-initial}$ | Initially scheduled bandwidth for the same TB, expressed as # of subcarriers |
| $M_{SC}^{PUSCH}$ | scheduled bandwidth for the current PUSCH in the unit of subcarrier |
| C | number of codeblocks for the TB |
| $K_r$ | number of bits for code block number r |
| $\beta_{OFFSET}^{PUSCH}$ | offsets configured by higher layers |
| $N_{SYMB}^{PUSCH-initial}$ | number of SC-FDMA symbols in the subframe for initial PUSCH transmission |
| $N_{SYMB}$ | number of SC-FDMA symbols in the current PUSCH transmission subframes |
| L | the number of CRC bits where $L = \begin{cases} 0 & O \leq 11 \\ 8 & \text{otherwise} \end{cases}$ |

In order to calculate the total CQI bits, Equation 11 is used. In Equation 11, $Q_{CQI}$ denotes the total number of bits of coded CQI, $Q_m$ denotes the number of bits per symbol (2 for QPSK, 4 for 16QAM, and 6 for 64QAM). $Q_{CQI}'$ denotes the number of symbols coded by Equation 10. N denotes the number of layers to which one codeword is mapped.

$$Q_{CQI} = Q_m \cdot Q_{CQI}' \cdot N \quad \text{[Eqn. 11]}$$

The coded CQI/PMI bits are expressed by Equation 12.

$$b_0, b_1, b_2, \ldots, b_{B-1} \text{ where } B=32 \quad \text{[Eqn. 12]}$$

Equation 12 is derived from Equation 13 and Table 7.

$$b_i = \sum_{n=0}^{O-1} (o_n \cdot M_{i-n}) \bmod 2 \quad \text{[Eqn. 13]}$$

where $i = 0, 1, 2 \ldots B-1$.

TABLE 7

Basis sequences for (32, 0) code

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The output sequence $q_0, q_1, q_2, \ldots, q_{Q_{CQI}-1}$ is obtained by cyclic repetition of the CQI/PMI bits encoded using Equation 14.

$$q_i = b(i \bmod B) \text{ where } i = 0,1,2,\ldots,Q_{CQI}-1. \qquad [\text{Eqn. 14}]$$

In FIG. 4, a CRC is attached to each Transport Block (TB) at step 401. The CRC-attached TB is segmented into code blocks and the CRC is attached to individual code blocks again at step 402. Next, channel coding is performed on the CRC-attached code blocks at step 403, rate matching is performed on the channel-coded code blocks at step 404, and then the channel-coded code blocks are concatenated at step 405. The UL-SCH data of which total number of coded bits is G are expressed by Equation 15.

$$f_0, f_1, \ldots, f_{G-1}. \qquad [\text{Eqn. 15}]$$

The CQI data of which total number of coded bits is $C_{CQI}$ can be expressed by Equation 16.

$$q_0, q_1, \ldots, q_{Q_{CQI}-1}. \qquad [\text{Eqn. 16}]$$

At step 409 of FIG. 4, the code blocks concatenated at step 405 and the CQI channel-coded symbols at step 406 are multiplexed (data and control multiplexing) at step 409, and the vector sequence output of the multiplexed signal is expressed by Equation 17. In Equation 17, $H = (G + Q_{CQI})$ and $H' = H/Q_m/N$. Equation 18 shows the vector sequence output process under the assumption of N transmission layers.

$$g_0, g_1, \ldots, g_{H'} - 1. \qquad [\text{Eqn. 17}]$$

```
set i, j, k to 0
while j < Q_CQI           (placement of control information)
    k = k + 1
end while,
while i < G               (placement of data)
    k = k + 1
end while.                                              [Eqn. 18]
```

The input to the channel interleaver at step 410 of FIG. 4 is expressed as shown in Equation 19.

$$\underline{g_0}, \underline{g_1}, \ldots, \underline{g_{H'-1}}, q_0^{RI}, q_1^{RI}, \ldots, q_{Q_{RI}-1}^{RI}, q_0^{ACK}, q_1^{ACK}, \ldots, q_{Q_{ACK}-1}^{ACK}. \qquad [\text{Eqn. 19}]$$

The output bit sequence of the channel interleaver 410 is obtained as follows.

Step (1): $C_{mux} = N_{symb}^{PUSCH}$ is allocated for a number of columns of the channel interleaver matrix.

Step (2): $R_{mux} = (H'' \cdot Q_m \cdot N) C_{mux}$ is allocated for a number of rows of the channel interleaver matrix by taking into consideration the number of bits per symbol and the number of layers. Here, $H'' = H' + H_{RI}'$. $R_{mux}' = R_{mux}/Q_m/N$ takes in consideration the number of layers.

Step (3): The RI values are written in the $R_{mux} \times C_{mux}$ channel interleaver according to Equation 20. The column set to be used is defined as shown in Table 8.

```
Set i,j to 0
Set r to R_mux' - 1
while i < Q_RI'
    c_RI = ColumnSet(j)
    y_r × C_mux + c_RI = q_i^RI
    i = i + 1
```

-continued $$r = R_{mux}^l - 1 - \lfloor i/4 \rfloor$$
$$j = (j + 3) \bmod 4$$
end while

[Eqn. 20]

TABLE 8

Column Set for insertion of rank information

| CP configuration | Column Set |
|---|---|
| Normal | {1, 4, 7, 10} |
| Extended | {0, 3, 5, 8} |

Step (4): Generate a matrix of Equation 21 for $\underline{y}_k = \underline{g}_k$ in k=0, 1, ..., H'−1. At this time, skip the part occupied by the RI at step (3).

$$\begin{bmatrix} y_0 & y_1 & \cdots & y_{C_{max}-1} \\ y_{C_{max}} & y_{C_{max}+1} & \cdots & y_{2C_{max}-1} \\ \vdots & \vdots & \ddots & \vdots \\ y_{(R_{max}^l-1) \times C_{max}} & y_{(R_{max}^l-1) \times C_{max}+1} & \cdots & y_{(R_{max}^l \times C_{max}-1)} \end{bmatrix}$$

[Eqn. 21]

Step (5): Overwrite the matrix generated at step (4) with HARQ-ACK values as Equation 22. The column set to be used is defined as shown in Table 9.

Set i,j to 0
Set r to $R_{mux}^l - 1$
while $i < Q_{ACK}^l$
$c_{ACK}$ = ColumnSet(j)
$y_r \times C_{mux} + c_{ACK} = q_i^{ACK}$
i = i + 1
$r = R_{mux}^l - 1 - \lfloor i/4 \rfloor$
j = (j + 3)mod4
end while

[Eqn. 22]

TABLE 9

Column Set for insertion of HARQ-ACK information

| CP configuration | Column Set |
|---|---|
| Normal | {2, 3, 8, 9} |
| Extended | {1, 2, 6, 7} |

Step (6): The bit sequence is read from the top of the first column of the $R_{mux} \times C_{mux}$ channel interleaver matrix download and then the next column after the previous column is read completely until the last column is read completely.

If $Q_m=2$ the the two bits positioned ahead of other bits among the four bits constituting the symbol $\underline{y}_r$ in the channel interleaver are mapped to layer#1, and the two bits following the other bits among the four bits constituting the symbol $\underline{y}_r$ in the channel interleaver are mapped to layer#2.

If $Q_m=4$, the four bits positioned ahead of other bits among the eight bits constituting the symbol $\underline{y}_r$ in the channel interleaver are mapped to layer#1, and the four bits following the other bits among the eight bits constituting the symbol $\underline{y}_r$ in the channel interleaver are mapped to layer#2.

If $Q_m=6$, the six bits positioned ahead of other bits among the twelve bits constituting the symbol $\underline{y}_r$ in the channel interleaver are mapped to layer#1, and the six bits following the other bits among the twelve bits constituting the symbol $\underline{y}_r$ in the channel interleaver are mapped to layer#2.

Figure 5:
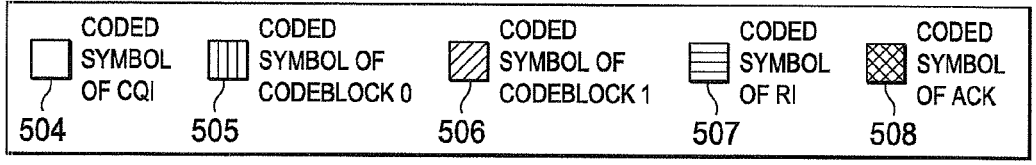
FIG. 5 is a diagram illustrating a mapping relationship between a single uplink channel interleaver and two layers according to the second embodiment of this disclosure.

FIG. 5 is a diagram illustrating a mapping relationship between a single uplink channel interleaver and two layers according to the second embodiment of this disclosure.

Assuming two layers 502 and 503, normal CP, and $Q_m=2$, the RI symbols 507 encoded into the second, fifth, eighth, and eleventh columns of the uplink channel interleaver 501 are written at the index positions of r1, r2, r3, r4, r5, r6, r7, r8, r9, r10, r11, r12, r13, r14, r15, and r16 as shown in FIG. 5. What is different from the first embodiment is that one encoded RI symbol consists of four bits in the second embodiment when $Q_m=2$. This is because the channel interleaver 501 according to the second embodiment generates the symbol taking into consideration the number of layers N.

When the first symbol of the first column of the uplink channel interleaver 501 is generated, the CQI bits 504 are written at the index positions 1, 2, 3, and 4. When the first symbols of the second column is generated, the CQI bits are written at the index positions 5, 6, 7, and 8. In this manner, the CQI bits are written at the index positions 1 to 32. The uplink channel interleaver 501 writes the four bits constituting the first symbol 505 of codeblock0 to the index positions 33, 34, 35, and 36 and the four bits of the next symbol of codeblock0 sequentially to the index positions 93, 94, 95, and 96. Next, the uplink channel interleaver 501 writes the four bits constituting the first symbol 506 of codeblockl. As shown in FIG. 5, the bits of the symbols of codeblockl are written sequentially at the index positions from 97 to 176. At this time, the index positions r1, r2, r3, r4, r5, r6, r7, r8, r9, r10, r11, r12, r13, r14, r15, and r16 occupied by the encoded RI bits are skipped. Finally, the coded ACK bits at symbols 508 are overwritten at the index position sets of 149, 150, 151, 152, 153, 154, 155, 156, 165, 166, 167, 168, 169, 170, 171, and 172. At this time, the ACK bits are sequentially written at the index positions 149, 150, 151, 152, 169, 170, 171, 172, 165, 166, 167, 168, 153, 154, 155, and 156.

In the uplink channel interleaver 501, the symbols are read downward from the first column in unit of symbol. After all of the symbols of the first column are read, the symbols of the next column are read. Since the symbols are written in the channel interleaver under the assumption of two layers and $Q_m=2$ in the second embodiment of this disclosure, if the symbols are read from the first column to be mapped to the two layers, the bits located at the index positions 1 and 2 occupied by the first CQI symbol in the uplink channel interleaver 501 are scrambled (see step 411 of FIG. 4), modulated into a modulation symbol (see step 412 of FIG. 4), and then mapped to layer#1 502 (see step 413 of FIG. 4). The bits located at the index positions 3 and 4 occupied by the first CQI symbol in the uplink channel interleaver 501 are scrambled (see step 411 of FIG. 4), modulated into a modulation symbol (see step 412 of FIG. 4), and then mapped to layer#2 503 (see step 413 of FIG. 4). In FIG. 5, the symbols in layer#1 502 and layer#2 503 should actually be expressed as modulation symbols. For example, when $Q_m=2$, the QPSK modulation mapping is expressed by $$\frac{1}{\sqrt{2}} + \frac{1}{\sqrt{2}} j$$

for 00 (bits of the symbol), $$\frac{1}{\sqrt{2}} - \frac{1}{\sqrt{2}} j$$

for 01, $$-\frac{1}{\sqrt{2}} + \frac{1}{\sqrt{2}}j$$

for 10, and $$-\frac{1}{\sqrt{2}} - \frac{1}{\sqrt{2}}j$$

for 11. In this embodiment, however, the bit indices generated by the uplink channel interleaver 501 are used in place of the modulation symbols in order to explain how the indices are mapped to the layers.

The bits located at the index positions 49 and 50 occupied by the data symbol of codeblock0 in the uplink interleaver 501 of FIG. 5 are scrambled at step 411 of FIG. 4, modulated into a modulation symbol at step 412 of FIG. 4, and mapped to layer#1 502 at step 413 of FIG. 4. The bits located at the index positions 51 and 52 occupied by the data symbol of codeblock0 in the uplink interleaver 501 of FIG. 5 are scrambled at step 411 of FIG. 4, modulated into a modulation symbol at step 412 of FIG. 4, and mapped to layer#2 503 at step 413 of FIG. 4. The bits located at the index positions 97 and 98 occupied by the data symbol of codeblock1 in the uplink interleaver 501 of FIG. 5 are scrambled at step 411 of FIG. 4, modulated into a modulation symbol at step 412 of FIG. 4, and mapped to layer#1 502 at step 413 of FIG. 4. The bits located at the index positions 99 and 100 occupied by the data symbol of codeblock1 in the uplink interleaver 501 of FIG. 5 are scrambled at step 411 of FIG. 4, modulated into a modulation symbol at step 412 of FIG. 4, and mapped to layer#2 503 at step 413 of FIG. 4. The bits located at the index positions 145 and 146 occupied by the data symbol of codeblock1 in the uplink interleaver 501 of FIG. 5 are scrambled at step 411 of FIG. 4, modulated into a modulation symbol at step 412 of FIG. 4, and mapped to layer#1 502 at step 413 of FIG. 4. The bits located at the index positions 147 and 148 occupied by the data symbol of codeblock1 in the uplink interleaver 501 of FIG. 5 are scrambled at step 411 of FIG. 4, modulated into a modulation symbol at step 412 of FIG. 4, and mapped to layer#2 503 at step 413 of FIG. 4.

After all of the symbols of the first column of the uplink channel interleaver 501 are read and mapped to the first column of layer#1 502 and layer#2 503, the data of the second column of the uplink channel interleaver 501 are mapped to layer#1 502 and layer#2 503 as follows. The CQI bits at symbols 504 located at the index positions 5 and 6 occupied by the second CQI symbol in the uplink channel interleaver 501 are scrambled at step 411 of FIG. 4, modulated into a modulation symbol at step 412 of FIG. 4, and mapped to layer#1 502 at step 413 of FIG. 4. The CQI bits located at the index positions 7 and 8 occupied by the second CQI symbol in the uplink channel interleaver 501 are scrambled at step 411 of FIG. 4, modulated into a modulation symbol at step 412 of FIG. 4, and mapped to layer#2 503 at step 413 of FIG. 4. Next, the bits located at the index positions 53 and 54 occupied by a symbol of codeblock0 are scrambled at step 411 of FIG. 4, modulated into a modulation symbol at step 412 of FIG. 4, and mapped to layer#1 502 at step 413 of FIG. 4. The bits located at the index positions 55 and 56 are scrambled at step 411 of FIG. 4, modulated into a modulation symbol at step 412 of FIG. 4, and mapped to layer#2 503 at step 413 of FIG. 4. The bits located at the index positions 101 and 102 occupied by a symbol of codeblock1 are scrambled at step 411 of FIG. 4, modulated into a modulation symbol at step 412 of FIG. 4, and mapped to layer#1 502 at step 413 of FIG. 4. The bits located at the index positions 103 and 104 occupied by the symbols of codeblock1 are scrambled at step 411 of FIG. 4, modulated into a modulation symbol at step 412 of FIG. 4, and mapped to layer#2 503 at step 413 of FIG. 4. The bits located at the index positions R1 and R2 occupied by an RI symbol in the uplink channel interleaver 501 are scrambled at step 411 of FIG. 4, modulated into a modulation symbol at step 412 of FIG. 4, and mapped to layer#1 502 at step 413 of FIG. 4. The bits located at the index positions R3 and R4 occupied by the RI symbol in the uplink channel interleaver 501 are scrambled at step 411 of FIG. 4, modulated into a modulation symbol at step 412 of FIG. 4, and mapped to layer#2 503 at step 413 of FIG. 4. In the same manner, all the symbols from first to last column are mapped to layer#1 502 and layer#2 503.

After being mapped to the transmission layers at step 413 of FIG. 4, the codewords mapped to layer#1 are processed in the procedure of steps 414, 415, 416, and 417, and the codewords mapped to layer#2 are processed in the procedure of steps 418, 415, 420, and 421. That is, after step 413, layer#1 502 and layer#2 503 are transformed by DFT at steps 414 and 418, precoded by multiplying precoding matrix at step 415, mapped to corresponding resources at steps 416 and 420, and then transmitted through respective antenna ports in the form of SC-FDMA signals at steps 417 and 421.

In the second embodiment of this disclosure, the channel interleaver calculates a number of symbols according to the number of layers, each symbol consisting of a number bits equal to the value obtained by multiplying the number of bits of a modulation symbol with the number of transmission layers, and generating a symbol to be mapped to layer 1 by scrambling and modulating half of the bits of a modulation symbol and another symbol to be mapped to layer 2 by scrambling and modulating the other half of the bits of the modulation symbol, whereby the CQI bits are transmitted as equally distributed on two layers.

If a single codeword is to be transmitted mapped to one layer, this is the case where CW#0 is mapped to layer#1 in rank-1 transmission, CW0 is mapped to layer#1 in rank-2 transmission, CW#1 is mapped to layer#2, or CW#0 is mapped to layer#1, especially the case where CW#1 is mapped to layer#2 and layer#3 in rank-3 transmission and CW#0 is mapped to layer#1 and layer#2 or CW#1 is mapped to layer#3 and layer#4 in rank-4 transmission when a single codeword is mapped to two layers. With the method disclosed in the second embodiment of this disclosure, the interleaving and layer mapping operations are performed by taking into consideration the number of transmission layers such that it is possible to transmit the control information as equally distributed on the transmission layers regardless of the number of transmission layers to which the codeword is mapped.

In a third embodiment of this disclosure, the UCI is carried with two codewords. In the case in which two codewords are transmitted, all of the transmission layers are used to transmit the UCI. Like the second embodiment, the third embodiment defines the operations of the channel interleaver as taking into consideration the number of layers per codeword and maps the codewords to the layers.

Figure 6:
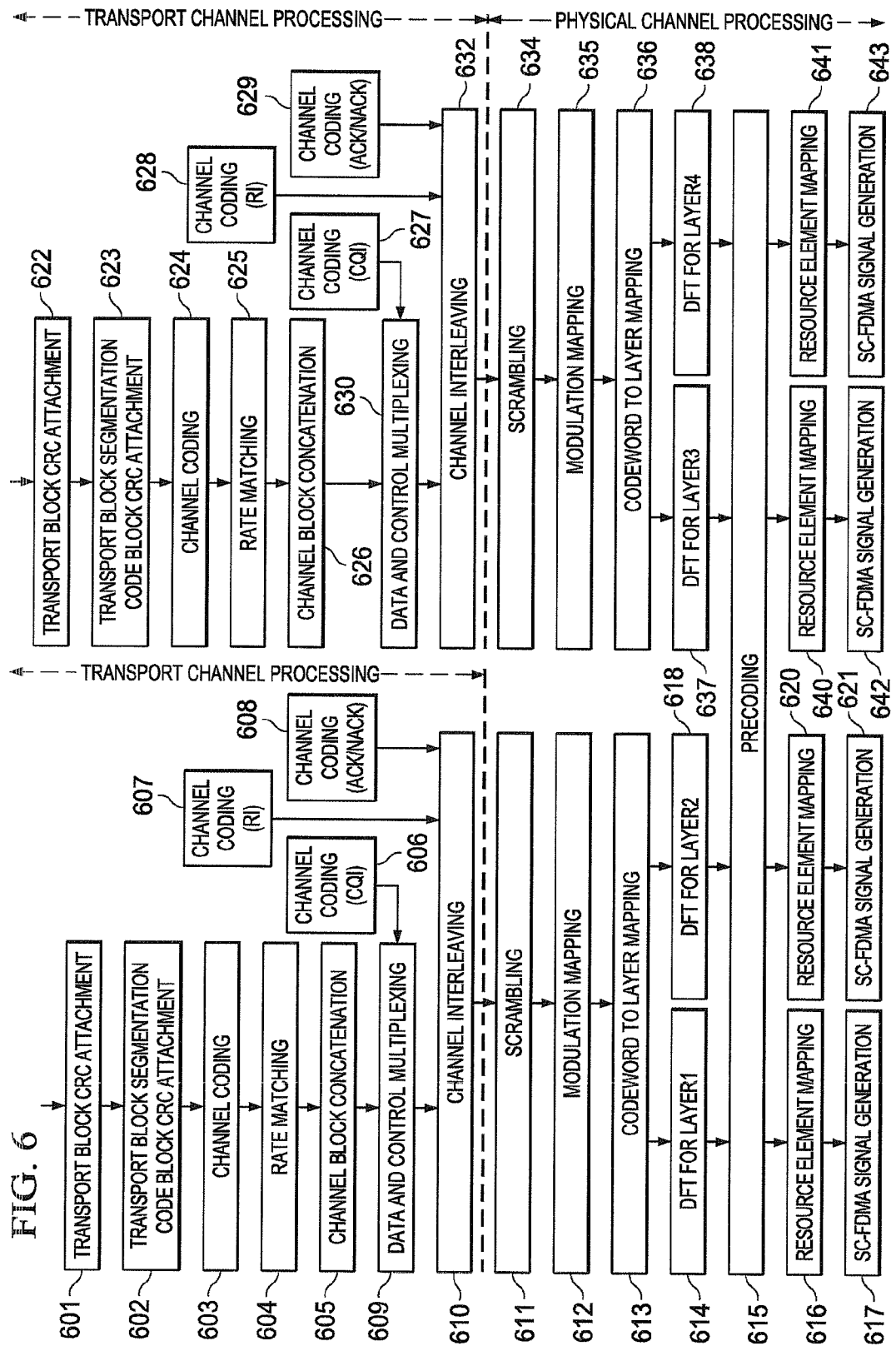
FIG. 6 is a diagram illustrating a procedure of a transmitter for processing data and UCI on the transport and physical channels according to a third embodiment of this disclosure.

FIG. 6 is a diagram illustrating a procedure of a transmitter processing data and UCI on the transport and physical channels according to the third embodiment of this disclosure. FIG. 6 shows how the UCI carried in two codewords are mapped to all of the transmission layers.

Referring to FIG. 6, the number of RI, ACK, and CQI symbols per codeword and the number of RI, ACK, and CQI bits are derived by Equations 1, 2, 10, and 11, and the channel interleaving and layer mapping operations are identical to those of the second embodiment. In FIG. 6, CW#0 and C#1 are different from each other in the number of RI, ACK, and CQI symbols and RI, ACK, and CQI bits according to the modulation and coding scheme (MCS) of individual codewords. In the case in which a certain codeword is mapped to two transmission layers, the RI, ACK, and CQI are equally distributed on the layers to be transmitted. For example, when CW#0 is mapped to layer#1 and layer#2 and CW#1 is mapped to layer#3 and layer#4 in rank-4 transmission, although the numbers of the RI, ACK, and CQI allocated to CW#0 and CW#1 are different from each other, the RI, ACK, an CQI symbols mapped to layer#1 and layer#2 are equally distributed on layer#1 and layer#2, and the RI, ACK, and CQI symbols mapped to layer#3 and layer#4 are equally distributed on layer#3 and layer#4.

In FIG. 6, a CRC is attached to each Transport Block (TB) of CW#0 at step 601, and the CRC-attached TB is segmented into code blocks and then the CRC is attached to individual code blocks again at step 602. The code blocks are channel-coded at step 603, rate-matched at step 604, and concatenated at step 605. The number of RI, ACK, and CQI symbols and the RI, ACK, and CQI bits at steps 606, 607, 608, and 609 take into consideration the number of layers. The data symbols and UCI symbols are written in the uplink channel interleaver take into consideration the number of layers at step 610. Scrambling is performed on CW#0 at step 611, and the initialization value is obtained by Equation 23. For CW#0, q is 0.

$$C_{init} = n_{RNTI} \cdot 2^{14} + q \cdot 2^{13} + \left\lfloor \frac{n_s}{2} \right\rfloor \cdot 2^9 + N_{ID}^{cell}.$$  [Eqn. 23]

In the case in which the CW#0 is mapped to two layers, one symbol of the channel interleaver consists of a number of bits equal to the value obtained by multiplying the number of layers and the number of bits of a symbol such that the modulation symbol is generated taking into consideration only the number of bits of a symbol at step 612. At the codeword-to-layer mapping step 613, the symbols modulated by the channel interleaver are mapped to two layers sequentially. Afterward, DFT is performed on the respective layer#1 and layer#2 at steps 614 and 618.

Meanwhile, a CRC is attached to each Transport Block (TB) of CW#1 at step 622, and the CRC-attached TB is segmented into code blocks and then the CRC is attached to individual code blocks again at step 623. The code blocks are channel coded at step 624, rate matched at step 625, and concatenated at step 626. The numbers of RI, ACK, and CQI symbols and the RI, ACK, and CQI bits at steps 627, 628, 629, and 630 take into consideration the number of layers. The data symbols and UCI symbols are written in the uplink channel interleaver by taking into consideration the number of layers at step 632. Scrambling is performed on CW#1 at step 634, and the initialization value $C_{init}$ is obtained by Equation 23. For CW#1, q is 1. That is, the scrambling initialization value is set to different values for CW#0 and CW#1. In the case in which the CW#1 is mapped to two layers, one symbol of the channel interleaver consists of a number of bits equal to the value obtained by multiplying the number of layers and the number of bits of a symbol such that the modulation symbol is generated by taking into consideration only the number of bits of a symbol at step 635. At the codeword-to-layer mapping step 636, the symbols modulated by the channel interleaver are mapped to two layers sequentially. Afterward, DFT is performed on the respective layer#3 and layer#4 at steps 637 and 638.

After being mapped to the corresponding layers and transformed by DFT at steps 614, 618, 637, and 638, the CW#0 and CW#1 are precoded at step 615.

After being precoded at step 615 of FIG. 6, the codes words are mapped to corresponding resources at steps 616, 620, 640 and 641, and then transmitted through respective antenna ports in the form of SC-FDMA signals at steps 617, 621, 642 and 643.

Figure 7:
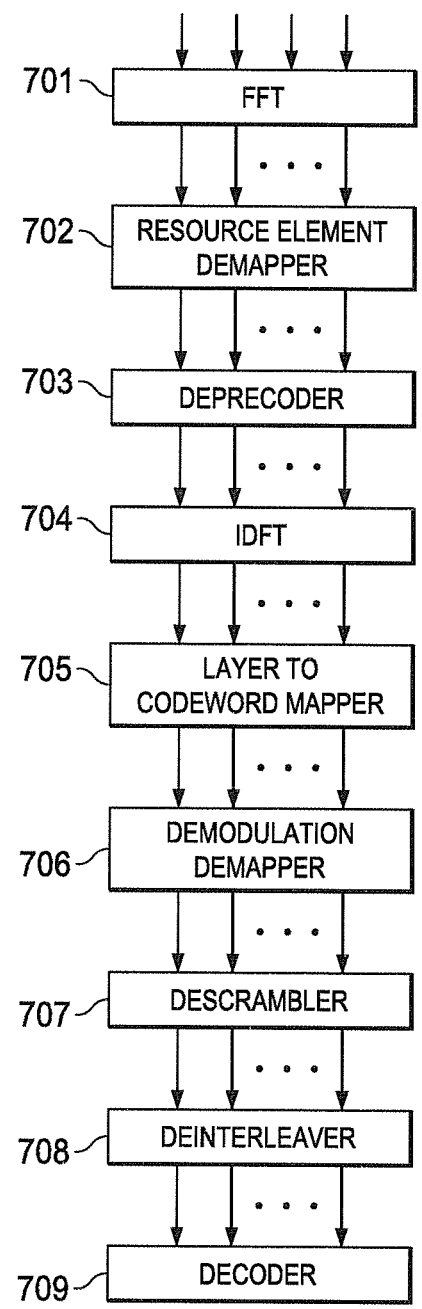
FIG. 7 is a block diagram illustrating a configuration of a receiver for use in the second and third embodiments of this disclosure.

FIG. 7 is a block diagram illustrating a configuration of a receiver for use in the second and third embodiments of this disclosure.

Referring to FIG. 7, the FFT 701 performs FFT on the signal received by means of multiple antennas, and the resource element demapper 702 demaps the resources. The deprecoder 703 performs deprecoding on the signals received by the antenna ports, and the inverse discrete Fourier transform (IDFT) 704 performs IDFT per layer. The layer to codeword mapper 705 performs demapping on the signal transformed by IDFT 704 to obtain symbols per codeword. The demodulation demapper 706 performs demodulation on the symbols per layer, the descrambler 707 performs descrambling on the demodulated signals, and the deinterleaver 708 performs deinterleaving on the descrambled signals taking into consideration of the number of layers per codeword. The decoder 709 performs decoding on the data and RI, ACK, and CQI information.

In the third embodiment of this disclosure, the codeword-to-layer mapping step 613 follows the modulation mapping step 612. Meanwhile, a fourth embodiment of this disclosure replaces the codeword-to-layer mapping step with per-layer channel interleaving step.

Figure 8:
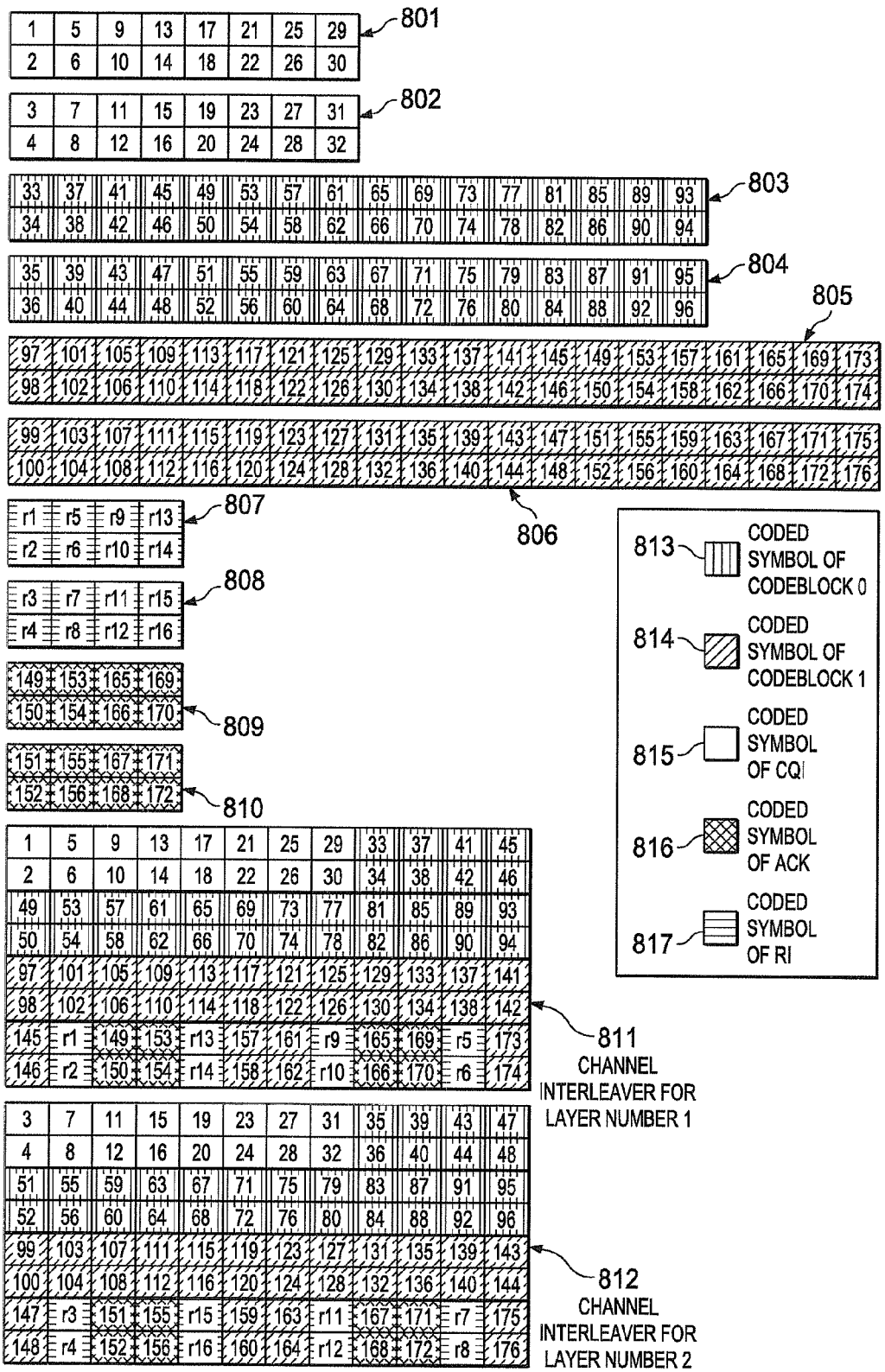
FIG. 8 is a diagram illustrating per-layer uplink channel interleaving according to a fourth embodiment of this disclosure.

FIG. 8 is a diagram illustrating per-layer uplink channel interleaving according to the fourth embodiment of this disclosure. FIG. 8 shows two uplink channel interleavers 811 and 812 for layer#1 and layer#2, respectively, to which one codeword is mapped.

Figure 9:
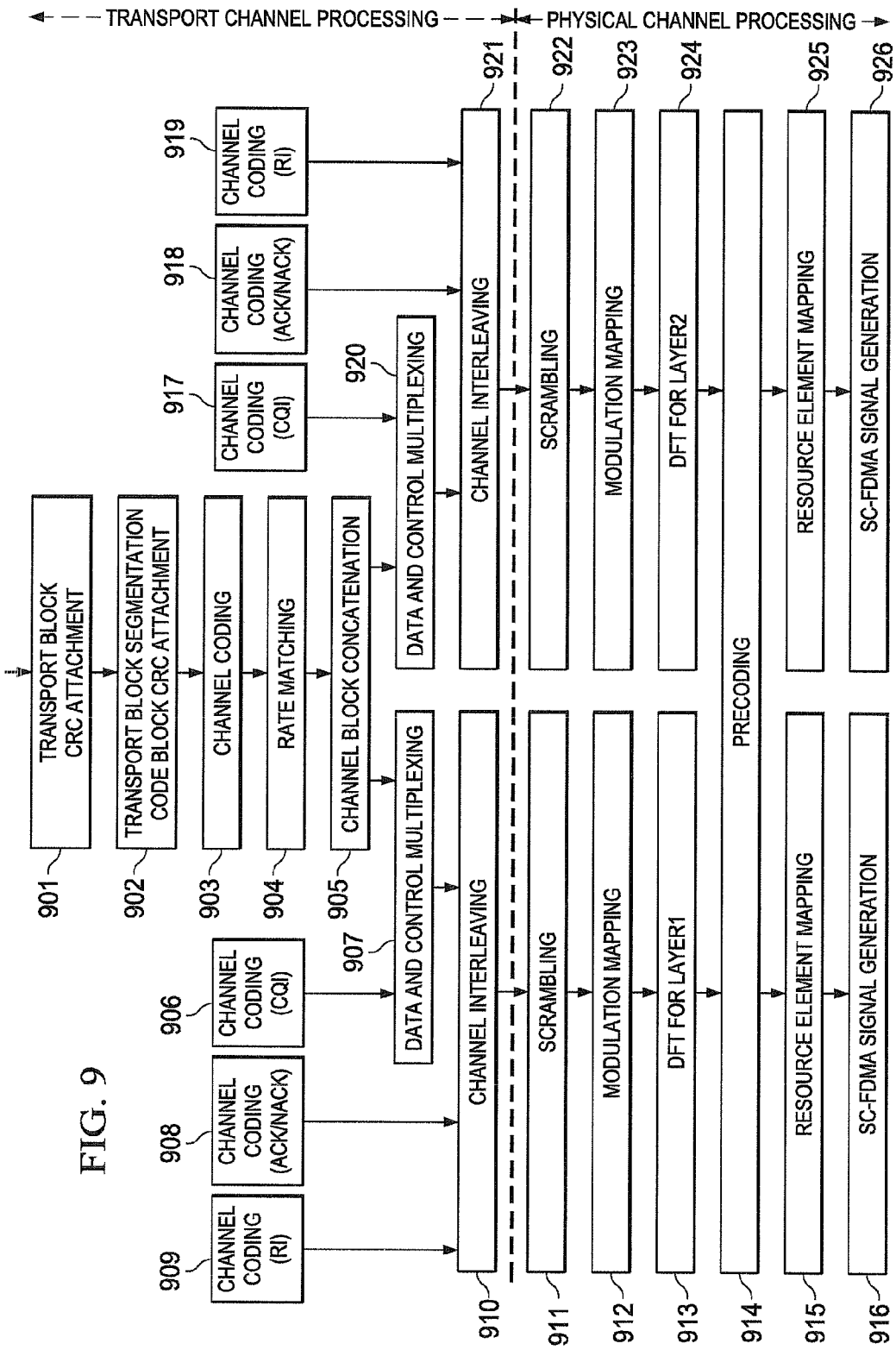
FIG. 9 is a diagram illustrating a procedure of a transmitter processing data and UCI on the transport and physical channels according to the fourth embodiment of this disclosure.

FIG. 9 is a diagram illustrating a procedure of a transmitter processing data and UCI on the transport and physical channels according to the fourth embodiment of this disclosure.

In FIG. 9, a CRC is attached to one Transport Block (TB) at step 901, and the CRC-attached TB is segmented into code blocks such that the CRC is attached to each code block again at step 902. Next, the code blocks are channel-coded at step 903, rate-matched at step 904, and concatenated at step 905. At step 906, the UE determines a number of coded symbols for CQI transmission. The coded bits constituting the code blocks are arranged in unit of symbol according to the number of coded bits $Q_m$ as denoted by reference numbers 803, 804, 805, and 806. If $Q_m=2$ in FIG. 8, the coded bits indexed by 33 to 176 constituting the code blocks are mapped to the symbols by 2 bits. That is, the first symbol 813 of the code block 803 is composed of two bits located at the index positions 33 and 34, and the first symbols 813 of the code block 804 is composed of two bits located at the index positions 35 and 36, the second symbol of the code block 803 is composed of two bits located at the index positions 37 and 38, and the second symbol of the code block 804 is composed of two bits located at the index positions 39 and 40. In this manner, the symbols 814 of the code blocks 805 and 806 are composed of the bits that are allocated to the symbols by 2 bits alternately. The code blocks 803 and 805 are used at the data and control multiplexing for layer#1 at step 907 of FIG. 9, and the code blocks 804 and 806 are used at the data and control multiplexing for layer#2 at step 920 of FIG. 9. At steps 917, 918 and 919 of FIG. 9, the UE determines a number of coded symbols for CQI, ACK and RI transmissions, respectively.

In FIG. 9, the number of RI and ACK symbols to be transmitted on each layer is calculated by Equation 24. The process can be explained with formulas as follows. The UE determines the number of coded symbols Q' for ACK and RI transmission using Equation 24 at step 908 and 909 of FIG. 9, respectively. In Equation 24, O denotes a number of ACK or RI bits, and the parameters are defined as shown in Table 10.

$$Q' = \min\left(\left\lceil \frac{O \cdot M_{SC}^{PUSCH-initial} \cdot N_{SYMB}^{PUSCH-initial} \cdot \beta_{OFFSET}^{PUSCH}}{\sum_{r=0}^{C-1} K_r} \right\rceil, 4M_{SC}^{PUSCH}\right)$$ [Eqn. 24]

TABLE 10

Definitions of parameters used in Equation 24

| | |
|---|---|
| O | The number of ACK/NACK, or RI, |
| $M_{SC}^{PUSCH-initial}$ | Initially scheduled bandwidth for the same TB, expressed as number of subcarriers |
| $M_{SC}^{PUSCH}$ | scheduled bandwidth for the current PUSCH in the unit of subcarrier |
| C | number of codeblocks for the TB |
| $K_r$ | number of bits for code block number r |
| $\beta_{OFFSET}^{PUSCH}$ | offsets configured by higher layers |
| $N_{SYMB}^{PUSCH-initial}$ | number of SC-FDMA symbols in the subframe for initial PUSCH transmission |
| $N_{SYMB}$ | number of SC-FDMA symbols in the current PUSCH transmission subframes |

In order to calculated the total number of coded HARQ-ACK bits to be transmitted on layer#1 and layer#2, Equation 25 is used. In Equation 25, $Q_{ACK}$ denotes a number of bits per symbol (2 for QPSK, 4 for 16QAM, and 6 for 64QAM). N denotes a number of layers to which one codeword is mapped.

$$Q_{ACK} = Q_m \cdot Q'_{ACK} \cdot N.$$ [Eqn. 25]

In an exemplary case where $Q'_{ACK}=4$, $Q_m=2$, and $N=2$, $Q_{ACK}$ is 16. Since $Q_{ACK}$ is 16, $q_0^{ACK}, q_1^{ACK}, \ldots, q_{Q_{ACK}-1}^{ACK}$ is generated by concatenating the coded values of Table 12 and can be expressed by Equation 26. In case that 1 bit is necessary for HARQ-ACK is necessary, the encoded value of Table 11 is used.

$$q_0^{ACK}, q_1^{ACK}, \ldots, q_{Q_{ACK}-1}^{ACK} = [o_0^{ACK} o_1^{ACK} o_2^{ACK} \\ o_0^{ACK} o_1^{ACK} o_2^{ACK} o_0^{ACK} o_1^{ACK} o_2^{ACK} o_0^{ACK} \\ o_1^{ACK} o_2^{ACK} o_0^{ACK} o_1^{ACK} o_2^{ACK} o_0^{ACK}].$$ [Eqn. 26]

TABLE 11

Encoding of 1-bit HARQ-ACK

| $Q_m$ | Encoded HARQ-ACK |
|---|---|
| 2 | $[o_0^{ACK} y]$ |
| 4 | $[o_0^{ACK} y\ x\ x]$ |
| 6 | $[o_0^{ACK} y\ x\ x\ x\ x]$ |

TABLE 12

Encoding of 2-bit HARQ-ACK

| $Q_m$ | Encoded HARQ-ACK |
|---|---|
| 2 | $[o_0^{ACK} o_1^{ACK} o_2^{ACK} o_0^{ACK} o_1^{ACK} o_2^{ACK}]$ |
| 4 | $[o_0^{ACK} o_1^{ACK} x\ x\ o_2^{ACK} o_0^{ACK} x\ x\ o_1^{ACK} o_2^{ACK} x\ x]$ |
| 6 | $[o_0^{ACK} o_1^{ACK} x\ x\ x\ x\ o_2^{ACK} o_0^{ACK} x\ x\ x\ x\ o_1^{ACK} o_2^{ACK} x\ x\ x]$ |

Although the total number of bits $Q_{ACK}$ for layer#1 and layer#2 is 16, the number of bits to be transmitted on each transmission layer is 8.

In FIG. 8, reference number 809 denotes 8 bits at ACK symbols 816 to be transmitted on layer#1, and reference number 810 denotes 8 bits to be transmitted on layer#2. Assuming $Q_m=2$, the first two bits $q_0^{ACK}$ and $q_1^{ACK}$ among the 16 bits in Equation 26 are mapped to the first symbol of code block 809 of FIG. 8, and the next two bits $q_2^{ACK}$ and $q_3^{ACK}$ are mapped to the first symbol of code block 810. Accordingly, 8-bit ACK information is transmitted on both layer#1 and layer#2 and, as a consequence, a total of 16 bits of ACK information is transmitted.

In order to express the total number of RI bits to be transmitted on layer#1 and layer#2, Equation 27 is used. In Equation 27, $Q_{RI}$ denotes the total number of coded RI bits, and $Q_m$ denotes a number of bits per symbol (2 for QPSK, 4 for 16QAM, and 6 for 64QAM). N denotes a number of layers to which one codeword is mapped.

$$Q_{RI} = Q_m \cdot Q'_{RI} \cdot N$$ [Eqn. 27]

In an exemplary case where $Q'_{RI}=4$, $Q_m=2$, and $N=2$, $Q_{RI}$ is 16. Since $Q_{RI}$ is 16, $q_0^{RI}, q_1^{RI}, \ldots, q_{Q_{RI}-1}^{RI}$ is generated by concatenating the coded values of Table 14 and can be expressed by Equation 28. In the case in which the maximum rank of RI is 2, the encoded value of Table 13 is used.

$$q_0^{RI}, q_1^{RI}, \ldots, q_{Q_{RI}-1}^{RI} = [o_0^{RI} o_1^{RI} o_2^{RI} o_0^{RI} o_1^{RI} o_2^{RI} \\ o_0^{RI} o_1^{RI} o_2^{RI} o_0^{RI} o_1^{RI} o_2^{RI} o_0^{RI} o_1^{RI} o_2^{RI} o_0^{RI}].$$ [Eqn. 28]

TABLE 13

Encoding of 1-bit RI

| $Q_m$ | Encoded RI |
|---|---|
| 2 | $[o_0^{RI} y]$ |
| 4 | $[o_0^{RI} y\ x\ x]$ |
| 6 | $[o_0^{RI} y\ x\ x\ x\ x]$ |

TABLE 14

Encoding of 20-bit RI

| $Q_m$ | Encoded RI |
|---|---|
| 2 | $[o_0^{RI} o_1^{RI} o_2^{RI} o_0^{RI} o_1^{RI} o_2^{RI}]$ |
| 4 | $[o_0^{RI} o_1^{RI} x\ x\ o_2^{RI} o_0^{RI} x\ x\ o_1^{RI} o_2^{RI} x\ x]$ |
| 6 | $[o_0^{RI} o_1^{RI} x\ x\ x\ x\ o_2^{RI} o_0^{RI} x\ x\ x\ x\ o_1^{RI} o_2^{RI} x\ x\ x\ x]$ |

Although the total number of bits $Q_{ACK}$ for layer#1 and layer#2 is 16, the number of bits to be transmitted on each transmission layer is 8.

In FIG. 8, reference number 807 denotes 8 RI bits at symbols 817 to be transmitted on layer#1, and reference number 808 denotes 8 RI bits to be transmitted on layer#2. Assuming $Q_m=2$ the first two bits $q_0^{RI}$ and $q_1^{RI}$ among the 16 bits of Equation 28 are mapped to the first symbol of code block 807 of FIG. 8 (referred to as r1 and r2), and the next two bits $q_2^{RI}$ and $q_3^{RI}$ are mapped to the first symbol of code block 808 (referred to as r3 and r4).

Accordingly, 8-bit RI information is transmitted on both layer#1 and layer#2 and, as a consequence, a total of 16 bits of RI information is transmitted.

In FIG. 9, the UE determines the number of encoded symbols Q′ using equation (29) for CQI transmission on one layer. In Equation 29, O denotes a number CQI bits, and $M_{SC}^{PUSCH}$ denotes the bandwidth scheduled for PUSCH transmission in the current subframe and expressed as the number of subcarriers. $N_{SYMB}^{PUSCH-initial}$ denotes a number of SC-FDMA symbols per subframe which is used in the initial transmission. The parameters used in Equation 29 are defined in Table 15.

$$Q' = \min\left(\left\lceil\frac{(O+L) \cdot M_{SC}^{PUSCH-initial} \cdot N_{SYMB}^{PUSCH-initial} \cdot \beta_{OFFSET}^{PUSCH}}{\sum_{r=0}^{C-1} K_r}\right\rceil, \right.$$
$$\left. M_{SC}^{PUSCH} \cdot N_{SYMB}^{PUSCH} - \frac{Q_{RI}}{Q_m \cdot N}\right)$$ [Eqn. 29]

TABLE 15

Definitions of parameter used in Equation 29

| | |
|---|---|
| O | number of CQI bits |
| $M_{SC}^{PUSCH-initial}$ | Initially scheduled bandwidth for the same TB, expressed as # of subcarriers |

TABLE 15-continued

Definitions of parameter used in Equation 29

| | |
|---|---|
| $M_{SC}^{PUSCH}$ | scheduled bandwidth for the current PUSCH in the unit of subcarrier |
| C | number of codeblocks for the TB |
| $K_r$ | number of bits for code block number r |
| $\beta_{OFFSET}^{PUSCH}$ | offsets configured by higher layers |
| $N_{SYMB}^{PUSCH-initial}$ | number of SC-FDMA symbols in the subframe for initial PUSCH transmission |
| $N_{SYMB}$ | number of SC-FDMA symbols in the current PUSCH transmission subframes |
| L | the number of CRC bits where $L = \begin{cases} 0 & O \le 11 \\ 8 & \text{otherwise} \end{cases}$ |

In order to calculate the total number of CQI bits to be transmitted on layer#1 and layer#2, Equation 30 is used. In Equation 30, $Q_{CQI}$ denotes the total number of encoded CQI bits, and $Q_m$ denotes a number of bits per symbol (2 for QPSK, 4 for 16QAM, and 6 for 64QAM). $Q_{CQI}'$ denotes the number of coded symbols. N denotes a number of layers to which one codeword is mapped.

$$Q_{CQI} = Q_m \cdot Q_{CQI}' \cdot N$$ [Eqn. 30]

The coded CQI/PMI bits can be expressed as Equation 31.

$$b_0, b_1, b_2, \ldots, b_{B-1} \text{ where } B=32$$ [Eqn. 31]

Equation 31 is derived from Equation 32 and Table 16.

$$b_i = \sum_{n=0}^{O-1} (o_n \cdot M_{i,n}) \bmod 2 \text{ where } i = 0, 1, 2 \ldots B - 1$$ [Eqn. 32]

TABLE 16

Basis sequences for (32, 0) code

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 0 | 0 | 1 | 1 | 0 | 1 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |

TABLE 16-continued

Basis sequences for (32, 0) code

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The output sequence $q_0, q_1, q_2, \ldots, q_{Q_{CQI}-1}$ is obtained by cyclic repetition of coded CQI/PMI bits using Equation 33.

$$q_i = b(i \bmod B) \text{ where } i=0,1,2,\ldots,Q_{CQI}-1 \quad \text{[Eqn. 33]}$$

In an exemplary case where $Q_{CQI}'=8$, $Q_m=2$, and N=2, $Q_{CQI}$ is 32. Although the total number of bits $Q_{CQI}$ for layer#1 and layer#2 is 32, the number of bits to be transmitted on each transmission layer is 16.

In FIG. 8, reference number 801 denotes the 16 CQI bits at symbols 815 to be transmitted on layer#1, and reference number 802 denotes the 16 CQI bits to be transmitted on layer#2. Assuming $Q_m=2$, the first two bits $q_0$ and $q_1$ among the 32 bits in Equation 33 are mapped to the first symbol of code block 801 of FIG. 8 (referred to as indices 1 and 2), and the next two bits $q_2$ and $q_3$ are mapped to the first symbol of code block 802 (referred to as indices 3 and 4). In this manner, the information bits are mapped to two different layers alternately. Accordingly, 16-bit CQI information is transmitted on both layer#1 and layer#2, and as a consequence, a total of 32 bits of CQI information is transmitted. The channel interleaver matrix for layer#1 is composed of the CQI information bits 801, data information bits 803 and 805, ACK information bits 809, and RI information bits 807. The channel interleaver matrix for layer#2 is composed of the CQI information bits 802, data information bits 804 and 806, ACK information bits 810, and RI information bits 808. The channel interleaver matrix is generated as defined in Rel-8 standard.

After channel interleaving for layer#1 is performed at step 910, each bit is scrambled at step 911, and the initial value $C_{init}$ used is shown in Equation 34.

$$C_{init} = n_{RNTI} \cdot 2^{14} + q \cdot 2^{13} + \left\lfloor \frac{n_s}{2} \right\rfloor \cdot 2^9 + N_{ID}^{cell}. \quad \text{[Eqn. 34]}$$

After scrambling is performed, the scrambled signal is modulated into a modulation symbol by a modulation mapper at step 912 and then transformed by DFT at step 913.

After channel interleaving for layer#2 is performed at step 921, each bit is scrambled at step 922, and the initial value $C_{init}$ is used as shown in Equation 35. Using Equation 35, q is set to 0 or 1 for layer#1 of CW#1. q is set to 0 for the same CW to use the same scrambling initialization value, and q is set to 1 for the same CW to use different scrambling initialization values for respective layers.

If the UCI is transmitted on all of the layers to which two codewords are mapped, q is set to 0 for scrambling layer#1 and layer#2 and 1 for scrambling layer#3 and layer#4. In another method, q can be set to 0 for scrambling layer#1, 1 for scrambling layer#2, 2 for scrambling layer#3, and 3 for scrambling layer#4. That is, different scrambling can be applied to the individual layers.

$$C_{init} = n_{RNTI} \cdot 2^{14} + q \cdot 2^{13} + \left\lfloor \frac{n_s}{2} \right\rfloor \cdot 2^9 + N_{ID}^{cell}. \quad \text{[Eqn. 35]}$$

After scrambling is performed, the scrambled signal is modulated into a modulation symbol at step 923, and transformed by DFT at step 924. Next, the signals DFT-transformed at step 913 and 924 are precoded at step 914, mapped to the resource at step 915 and 925, transformed by IFFT at steps 916 and 926, and then transmitted.

Figure 10:
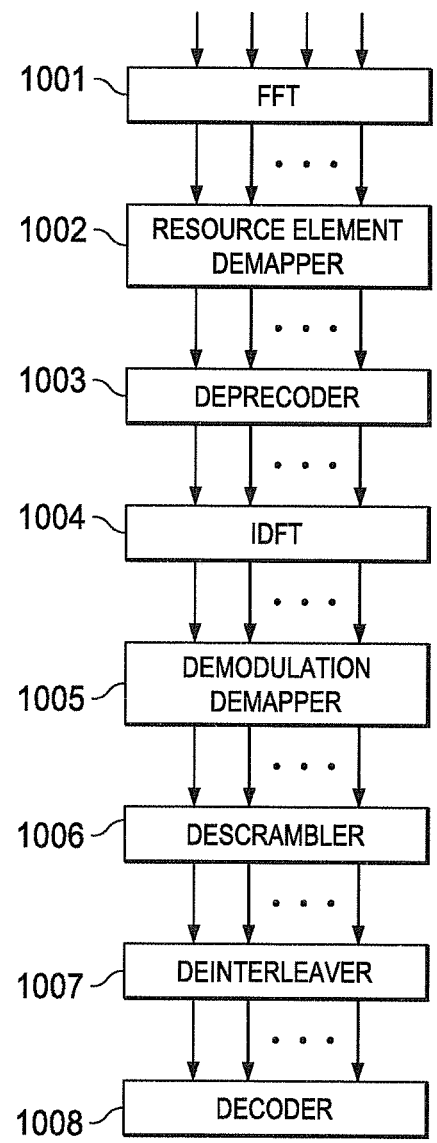
FIG. 10 is a block diagram illustrating a configuration of a receiver for use in the fourth embodiment of this disclosure.

FIG. 10 is a block diagram illustrating a configuration of a receiver for use in the fourth embodiment of this disclosure.

Referring to FIG. 10, the FFT 1001 performs FFT on the signal received by means of multiple antennas, and the resource element demapper 1002 demaps the resources. The deprecoder 1003 performs deprecoding on the signals received by the antenna ports, and the IDFT 1004 performs IDFT per layer. The demodulation demapper 1005 performs demodulation on the symbols per layer, the descrambler 1006 performs descrambling on the demodulated signals, and the deinterleaver 1007 performs deinterleaving per layer. The decoder 1008 performs decoding on the data and RI, ACK, and CQI information carried in uplink deinterleaver channel per codeword.

In a fifth embodiment of this disclosure, the ACK and RI symbols are replicated on all of the layers on which two codewords are transmitted and time division multiplexed with data as arranged in all of the layers simultaneously. The CQI are transmitted on only the layers to which one codeword is mapped. The ACK and RI symbols are replicated on all of the layers multiplexed in time domain to be distributed on all of the layers through the transport and physical channels processing procedure with the uplink channel interleaver.

Figure 11:
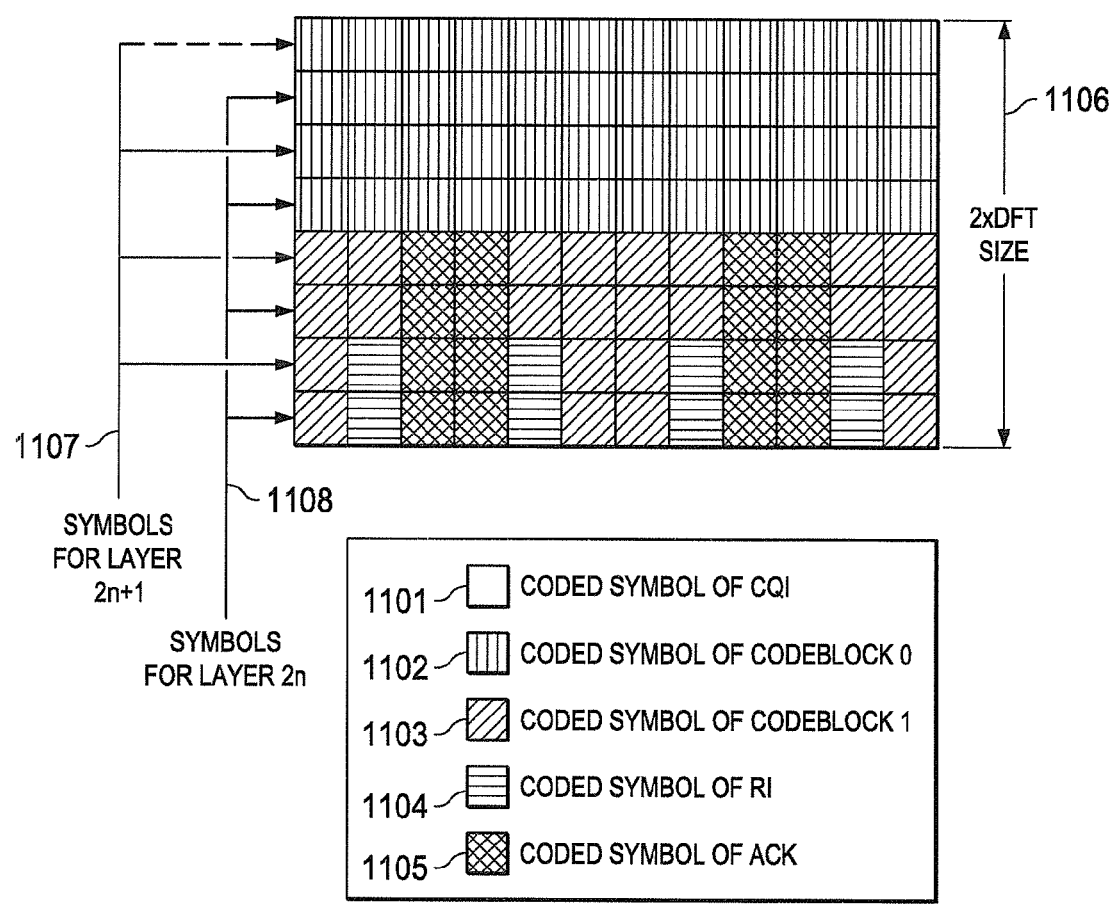
FIG. 11 is a diagram illustrating a configuration of a channel interleaver when the ACK and RI symbols are repeated on all of the layers according to an embodiment of this disclosure.

FIG. 11 is a diagram illustrating a configuration of a channel interleaver when the ACK symbols 1105 and RI symbols 1104 are repeated on all of the layers according to an embodiment of this disclosure.

As shown in FIG. 11, the ACK symbols 1105 and RI symbols 1104 are multiplexed with data in time domain (TDM) on the sections for layer 2n 1108 and layer 2n+1 1107. The numbers of ACK and RI symbols are determined in the same way described with the third embodiment in which the ACK and RI are distributed on all of the layers to which two codewords are mapped. The numbers of ACK and RI symbols also can be determined using Equation 36 with which the UE calculates the number of coded symbols Q'. That is, the number of coded symbols mapped to individual layers Q' is calculated by taking into consideration the two codewords mapped to all of the layers. In Equation 36, O denotes the number of ACK or RI bits, and the parameters used in Equation 36 are defined in Table 17. Also shown in FIG. 11 are coded symbols 1101 of CQI, coded symbols 1102 of codeblock 0, and coded symbols 1101 of codeblock 1.

$$Q' = \min\left(\left\lceil \frac{O \cdot M_{SC}^{PUSCH-initial} \cdot N_{SYMB}^{PUSCH-initial} \cdot \beta_{OFFSET}^{PUSCH}}{\sum_{r=0}^{C(0)-1} K_r^0 + \sum_{r=0}^{C(1)-1} K_r^1} \right\rceil, 4M_{SC}^{PUSCH}\right).$$  [Eqn. 36]

TABLE 17

| | |
|---|---|
| O | The number of ACK/NACK, or RI, |
| $M_{SC}^{PUSCH-initial}$ | Initially scheduled bandwidth for the same TB, expressed as number of subcarriers |
| $M_{SC}^{PUSCH}$ | scheduled bandwidth for the current PUSCH in the unit of subcarrier |
| | number of codeblocks for the TB |
| $K_r^0$ | number of bits for code block number r in CW#0 |
| $K_r^1$ | number of bits for code block number r in CW#1 |
| C(0) | number of codeblocks for the TB#0 (CW#0) |
| C(1) | number of codeblocks for the TB#1 (CW#1) |
| $\beta_{OFFSET}^{PUSCH}$ | offsets configured by higher layers |
| $N_{SYMB}^{PUSCH-initial}$ | number of SC-FDMA symbols in the subframe for initial PUSCH transmission |
| $N_{SYMB}$ | number of SC-FDMA symbols in the current PUSCH transmission subframes |

The CQI is transmitted on the layers to which one codeword is mapped. The number of CQI symbols can be determined according to a method for mapping the CQI to one selected codeword in the first and second embodiments. For CQI transmission, the UE determines the number of coded symbols Q' using Equation 37. In Equation 37, O denotes the number of CQI bits, and N denotes the number of layers to which the codewords carrying the CQI. $M_{SC}^{PUSCH}$ denotes the bandwidth scheduled for PUSCH transmission in the current subframe and is expressed as a number of subcarriers. $N_{SYMB}^{PUSCH-initial}$ denotes the number of SC-FDMA symbols per subframe used in initial transmission. The parameters used in Equation 37 are defined in Table 18.

$$Q' = \min\left(\left\lceil \frac{(O+L) \cdot M_{SC}^{PUSCH-initial} \cdot N_{SYMB}^{PUSCH-initial} \cdot \beta_{OFFSET}^{PUSCH}}{\sum_{r=0}^{C-1} K_r} \right\rceil, M_{SC}^{PUSCH} \cdot N_{SYMB}^{PUSCH} - \frac{Q_{RI}}{Q_m \cdot N}\right).$$  [Eqn. 37]

TABLE 18

| | |
|---|---|
| O | number of CQI bits |
| $M_{SC}^{PUSCH-initial}$ | Initially scheduled bandwidth for the same TB, expressed as # of subcarriers |
| $M_{SC}^{PUSCH}$ | scheduled bandwidth for the current PUSCH in the unit of subcarrier |
| C | number of codeblocks for the TB |
| $K_r$ | number of bits for code block number r |
| $\beta_{OFFSET}^{PUSCH}$ | offsets configured by higher layers |
| $N_{SYMB}^{PUSCH-initial}$ | number of SC-FDMA symbols in the subframe for initial PUSCH transmission |
| $N_{SYMB}$ | number of SC-FDMA symbols in the current PUSCH transmission subframes |
| L | the number of CRC bits where $L = \begin{cases} 0 & O \le 11 \\ 8 & \text{otherwise} \end{cases}$ |

In order to calculate the total number of CQI bits, Equation 38 is used. In Equation 38, $Q_{CQI}$ denotes the total number of coded CQI bits, $Q_m$ is 2 for QPSK, 4 for 16QAM, and 6 for 64QAM. $Q_{CQI}'$ denotes the number of coded symbols. N denotes the number of layers mapped to one codeword.

$$Q_{CQI} = Q_m \cdot Q_{CQI}' \cdot N$$  [Eqn. 38]

Figure 12:
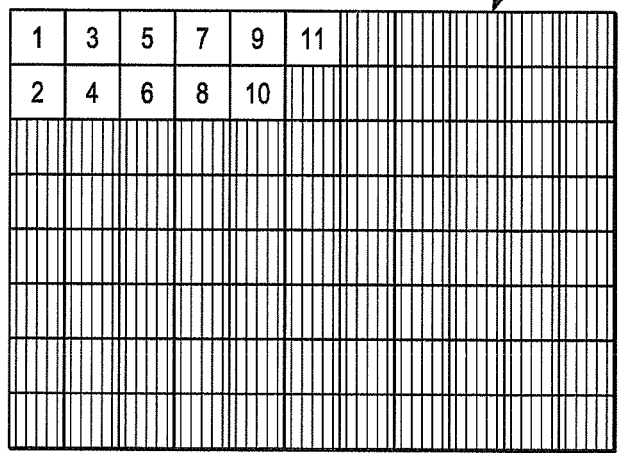
FIG. 12 is a diagram illustrating a CQI and data multiplexing according to an embodiment of this disclosure.

The CQI and data multiplexing can be performed with the methods described in the first and second embodiments. That is, the procedure for processing the transport and physical layers with the uplink channel interleaver is performed in the same way described in the first and second embodiments. The CQI and data multiplexing can be performed in another way as depicted in FIG. 12. There is a case in which the number of layers is not considered in calculating the total number of bits $Q_{CQI}$ and the number of CQI symbols $Q_{CQI}'$ is odd as shown in Equation 39. If the method of the first embodiment is used for this case, the CQI symbols are unequally distributed onto different layers, and the method of the second embodiment cannot use Equation 39 because the number of layers should be taken into consideration. By writing the CQI symbols 1201 in order as depicted in FIG. 12 and reading out the CQI symbols 1201 from the first column for the case where the CQI symbols are mapped to two layers, the CQI symbols 1, 3, 5, 7, 9, and 11 are transmitted on the first layer, and the CQI symbols 2, 4, 6, 8, and 10 are transmitted on the second layer.

Also shown are coded symbols 1202 of the codeblock.

$$Q_{CQI} = Q_m \cdot Q_{CQI}'$$  [Eqn. 39]

In order to output of a bit sequence of channel interleaver for distributing the odd number-th CQI symbols as equal as possible, $C_{mux} = N_{symb}^{PUSCH} = 12$ is assumed at k=0, 1, ... H' to generate ($R_{mux} \times C_{mux}$) matrix as shown in Equation 40. In Equation 40, $\underline{y}_k = \underline{g}_k$, and $\underline{g}_k$ is a sequence output by multiplexing data symbols and CQI symbols. In the matrix of Equation 40, the part that is already occupied by the RI symbols is skipped while writing the vector sequence in the matrix.

$$\begin{bmatrix} y_0 & y_2 & \cdots & y_{22} \\ y_1 & y_3 & \cdots & y_{23} \\ y_{24} & y_{26} & \cdots & y_{4C_{max}-2} \\ y_{25} & y_{27} & \cdots & y_{4C_{max}-1} \\ \vdots & \vdots & \cdots & \vdots \end{bmatrix}$$  [Eqn. 40]

The uplink transmission method and apparatus for uplink transmission in the LTE-Advanced system using two codewords and multiple transmit antennas according to an embodiment of this disclosure is capable of distributing, one codeword mapped to two layers, the UCI information onto two layers equally and, when two codewords are mapped to multiple layers, onto all of the layers equally. In some embodiments of this disclosure, the uplink control information is mapped or allocated onto a subset of the Ns layers being transmitted on the uplink in a MIMO uplink subframe. This subset of layers could be implicitly inferred by the UE according to (1) the number of codewords; (2) the codeword to layer mapping structure; and (3) the codeword that uses a highest MCS value. For example, if N=4 and layers 1,2 are used for codeword 1 transmission while layers 3, 4 are used for codeword 2 transmission, and if the MCS used by codeword 1 is better than the MCS used by codeword 2, then the UE can decide to transmit UL control information on layers 1 and 2, which correspond to the layers with the better MCS value.

Therefore, for one CW transmission, the UCI is mapped onto the layers of that CW. For two CWs transmission with different MCS value indicated by the UL grant, the UCI is mapped onto the layers of the CW with higher MCS value.

In addition, for the case in which two codewords have the same the same MCS, the following approaches are proposed:

Method 1: the UE always maps the UCI on CW0 (codeword0, or the first codeword), which is mapped to either layer 0 or layers 0 and 1, according to the CW to layer mapping table and transmission rank.

Method 2: the UE always maps the UCI on CW1 (codewordl, or the second codeword).

Method 3: the UE maps UCI on CW1 (the second codeword) for the case of rank 3 (3 layers) transmission, and maps UCI on CW0 for other rank transmissions. The reason for the special, treatment for rank 3 is that in rank3 CW0 is mapped to layer0, and CW1 is mapped to layers 1 and 2. Therefore, it may be better to map UCI to the CW with 2-layer transmission since this provides more resources for UCI transmission.

In some embodiments of this disclosure, some types of UCI are mapped onto all the N layers being transmitted on the uplink in a MIMO uplink subframe, while other types of UCI are mapped onto a subset of N layers, where the number of layers in a subset is denoted by Ns.

The types of UCIs that need more reliable reception at the eNodeB are mapped onto all the N layers.

Some examples of the subset of N layers, where the subset has Ns layers, are:
all the layers in CW0;
all the layers in CW1;
all the layers in a CW having higher MCS; and
smallest numbered layer in a CW having higher MCS.

In some embodiments, ACK/NACK and RI are mapped onto all the N layers, while CQI is mapped onto a subset of N layers, where the subset has the size Ns, and where the subset corresponds to all the layers in one of the two CWs. For example, CQI is mapped onto all the 2 layers in CW0, while ACK/NACK and RI are mapped onto all the 4 layers, in a 4-layer uplink transmission.

$Q_m^{AN}(n)$ and $Q_m^{RI}(n)$ used for A/N and RI, respectively, in n-th layer of the N layers are determined by a function of the modulation orders used for data transmission in the N layers, $Q_m^{Data}(n)$, n=1, ..., N.

In particular, in 3GPP LTE and LTE-A system, in the case of 2 CWs, two modulation orders can be used for data transmissions in the N layers. $\lfloor N/2 \rfloor$ layers corresponding to one CW use one modulation order Q1, and $\lceil N/2 \rceil$ layers corresponding to another CW use another modulation order Q2:

$$Q_m^{Data}(n) = \begin{cases} Q1, n = 1, \ldots, \lfloor N/2 \rfloor \\ Q2, n = \lfloor N/2 \rfloor + 1, \ldots N. \end{cases}$$

Here, Q1 and Q2 may or may not be the same and Q1, Q2 $\in \{2,4,6\}$.

In one example of the function determining the modulation orders for A/N and RI, the modulation orders in all the N layers are determined to be min(Q1, Q2), i.e. $Q_n^{AN}(n)$=min(Q1, Q2) and $Q_m^{RI}(n)$=min(Q1, Q2), for all n. This function ensures that A/N and RI use a modulation method that consumes the smaller amount of power between the two modulation methods of Q1 and Q2.

In another example of the function determining the modulation orders for A/N and RI, the modulation orders in all the N layers are determined to be max(Q1, Q2), i.e., $Q_n^{An}(n)$=max(Q1, Q2) and $Q_n^{RI}(n)$=max(Q1, Q2), for all n. This function ensures that A/N and RI use a modulation method that provides the higher reliability between the two modulation methods of Q1 and Q2.

In another example of the function determining the modulation orders for A/N and RI, the modulation orders in all the N layers are determined to be 2, i.e., $Q_n^{AN}(n)$=2 and $Q_m^{RI}(n)$=2, for all n. This function ensures that A/N and RI use a modulation method that consumes the smallest amount of power.

In another example of the function determining the modulation orders for A/N and RI, the modulation orders in all the N layers are determined to be 6, i.e., $Q_n^{AN}(n)$=6 and $Q_m^{RI}(n)$=6, for all n. This function ensures that A/N and RI use a modulation method that provides the highest reliability.

In one example of the function determining the modulation orders for A/N and RI, a modulation order in each of the N layers follows the modulation order used for data transmission, i.e., $Q_n^{AN}(n)=Q_n^{Data}(n)$ and $Q_m^{RI}(n)=Q_m^{Data}(n)$, for all n.

Given a modulation order of each layer, A/N and RI can be encoded according to methods described in Section 5.2.2.6 in 3GPP LTE 36.212 9.0.0, which is hereby incorporated by reference into the present application as if fully set forth herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station, comprising:
a transmit path circuitry configured to transmit an uplink grant to a subscriber station; and
a receive path circuitry configured to receive one or more multiple-input multiple-output (MIMO) uplink coded transport blocks from the subscriber station on a number $N_L$ of layers,
wherein at least one of acknowledgement/negative acknowledgement (ACK/NACK) information and rank indication (RI) information is transmitted in the one or more MIMO uplink coded transport blocks using at least one of a vector sequence $\underline{q}_k^{ACK}$ and a vector sequence $\underline{q}_k^{RI}$, and wherein each of $\underline{q}_k^{ACK}$ and $\underline{q}_k^{RI}$ comprises $N_L Q_m$ bits and includes one of a sequence $q_i^{ACK} \ldots q_{i+Q_{m-1}}^{ACK}$ of information and a sequence $q_i^{RI} \ldots q_{i+Q_{m-1}}^{RI}$ of information repeated $N_L$ times, where $Q_m$ is a number of bits per symbol, $q^{ACK}$ denotes a bit of coded ACK/NACK information, and $q^{RI}$ denotes a bit of coded RI information.

2. A method of operating a base station, the method comprising:
transmitting an uplink grant to a subscriber station; and
receiving from the subscriber station one or more multiple-input multiple-output (MIMO) uplink coded transport blocks on a number $N_L$ of layers,
wherein at least one of acknowledgement/negative acknowledgement (ACK/NACK) information and rank indication (RI) information is transmitted in the one or more MIMO uplink coded transport blocks using at least one of a vector sequence $\underline{q}_k^{ACK}$ and a vector sequence $\underline{q}_k^{RI}$, and wherein each of $\underline{q}_k^{ACK}$ and $\underline{q}_k^{RI}$ comprises $N_L Q_m$ bits and includes one of a sequence $q_i^{ACK} \ldots q_{i+Q_{m-1}}^{ACK}$ of information and a sequence $q_i^{RI} \ldots q_{i+Q_{m-1}}^{RI}$ of information repeated $N_L$ times, where $Q_m$ is a number of bits per symbol, $q^{ACK}$ denotes a bit of coded ACK/NACK information, and $q^{RI}$ denotes a bit of coded RI information.

3. A subscriber station comprising:
a receive path circuitry configured to receive an uplink grant from a base station; and
a transmit path circuitry configured to transmit one or more multiple-input multiple-output (MIMO) uplink coded transport blocks from the subscriber station on a number $N_L$ of layers,
wherein at least one of acknowledgement/negative acknowledgement (ACK/NACK) information and rank indication (RI) information is transmitted in the one or more MIMO uplink coded transport blocks using at least one of a vector sequence $\underline{q}_k^{ACK}$ and a vector sequence $\underline{q}_k^{RI}$, and wherein each of $\underline{q}_k^{ACK}$ and $\underline{q}_k^{RI}$ comprises $N_L Q_m$ bits and includes one of a sequence $q_i^{ACK} \ldots q_{i+Q_m-1}^{ACK}$ of information and a sequence $q_i^{RI} \ldots q_{i+Q_m-1}^{RI}$ of information repeated $N_L$ times, where $Q_m$ is a number of bits per symbol, $q^{ACK}$ denotes a bit of coded ACK/NACK information, and $q^{RI}$ denotes a bit of coded RI information.

4. A method of operating a subscriber station, the method comprising:
receiving an uplink grant from a base station; and
transmitting a multiple-input multiple-output (MIMO) uplink coded transport blocks from the subscriber station on a number $N_L$ of layers,
wherein at least one of acknowledgement/negative acknowledgement (ACK/NACK) information and rank indication (RI) information is transmitted in the one or more MIMO uplink coded transport blocks using at least one of a vector sequence $\underline{q}_k^{ACK}$ and a vector sequence $\underline{q}_k^{RI}$ and wherein each of $\underline{q}_k^{ACK}$ and $\underline{q}_k^{RI}$ comprises $N_L Q_m$ bits and includes one of a sequence $q_i^{ACK} \ldots q_{i+Q_m-1}^{ACK}$ of information and a sequence $q_i^{RI} \ldots q_{i+Q_m-1}^{RI}$ of information repeated $N_L$ times, where $Q_m$ is a number of bits per symbol, $q^{ACK}$ denotes a bit of coded ACK/NACK information, and $q^{RI}$ denotes a bit of coded RI information.

5. A base station, comprising:
a receive path circuitry configured to receive one or more multiple-input multiple-output (MIMO) uplink coded transport blocks from a subscriber station on a number $N_L$ of layers, the coded transport blocks comprising:
a vector sequence $\underline{q}_k^{ACK}$ carrying acknowledgement/negative acknowledgement (ACK/NACK) information and comprising $N_L Q_m$ bits formed using a sequence $q_i^{ACK} \ldots q_{i+Q_m-1}^{ACK}$ of information repeated $N_L$ times, where $Q_m$ is a number of bits per symbol and $q^{ACK}$ denotes a bit of coded ACK/NACK information,
a vector sequence $\underline{q}_k^{RI}$ carrying rank indication (RI) information and comprising $N_L Q_m$ bits formed using a sequence $q_i^{RI} \ldots q_{i+Q_m-1}^{RI}$ of information repeated $N_L$ times, where $q^{RI}$ denotes a bit of coded RI information, and
a vector sequence $\underline{g}_k$ carrying channel quality information (CQI).

6. The base station in accordance with claim 1, wherein the vector sequence $\underline{q}_k^{ACK}$ is formed by:

```
set i, k to 0
while i < Q_ACK
    if N = 1,
        q_k^ACK = [q_i^ACK ...q_{i+Q_m-1}^ACK]^T
    elseif N = 2,
        q_k^ACK = [q_i^ACK ...q_{i+Q_m-1}^ACK q_i^ACK ...q_{i+Q_m-1}^ACK]^T
    end if
    i = i + Q_m · N
    k = k + 1
end while,
``` where $Q_{ACK}$ denotes a number of total bits of coded ACK/NACK information.

7. The base station in accordance with claim 1, wherein the vector sequence $\underline{q}_k^{RI}$ is formed by:

```
set i, k to 0
while i < Q_RI
    if N = 1,
        q_k^RI = [q_i^RI ...q_{i+Q_m-1}^RI]^T
    elseif N = 2,
        q_k^RI = [q_i^RI ...q_{i+Q_m-1}^RI q_i^RI ...q_{i+Q_m-1}^RI]^T
    end if
    i = i + Q_m · N
    k = k + 1
end while,
``` where $Q_{RI}$ denotes a number of total bits of coded RI information.

8. The base station in accordance with claim 1, wherein channel quality information (CQI) is transmitted in the one or more MIMO coded transport blocks using a vector sequence $\underline{g}_k$ formed by:

```
set i, j, k to 0
while j < Q_CQI
    k = k + 1
end while,
while i < G
    k = k + 1
end while,
``` where $Q_{CQI}$ denotes a number of total bits of coded CQI, $q_j$ denotes a bit of coded CQI, $f_i$ denotes a bit of coded data, G denotes a total number of coded data bits, and $\underline{g}_k$ denotes an output of a data and control information multiplexing operation.

9. A method of operating a base station, the method comprising:
receiving one or more multiple-input multiple-output (MIMO) uplink coded transport blocks from a subscriber station on a number $N_L$ of layers, the coded transport blocks comprising:
a vector sequence $\underline{q}_k^{ACK}$ carrying acknowledgement/negative acknowledgement (ACK/NACK) information and comprising $N_L Q_m$ bits formed using a sequence $q_i^{ACK} \ldots q_{i+Q_m-1}^{ACK}$ of information repeated $N_L$ times, where $Q_m$ is a number of bits per symbol and $q^{ACK}$ denotes a bit of coded ACK/NACK information,
a vector sequence $\underline{q}_k^{RI}$ carrying rank indication (RI) information and comprising $N_L Q_m$ bits formed using a sequence $q_i^{RI} \ldots q_{i+Q_m-1}^{RI}$ of information repeated $N_L$ times, where $q^{RI}$ denotes a bit of coded RI information, and
a vector sequence $\underline{g}_k$ carrying channel quality information (CQI).

10. The method in accordance with claim 2, wherein the vector sequence $\underline{q}_k^{ACK}$ is formed by:

```
set i, k to 0
    while i < Q_ACK
        if N = 1,
            q_k^ACK = [q_i^ACK ...q_{i+Q_m-1}^ACK]^T
        elseif N = 2,
            q_k^ACK = [q_i^ACK ...q_{i+Q_m-1}^ACK q_i^ACK ...q_{i+Q_m-1}^ACK]^T
        end if
        i = i + Q_m · N
        k = k + 1
    end while,
``` where $Q_{ACK}$ denotes a number of total bits of coded ACK/NACK information.

11. The method in accordance with claim 2, wherein the vector sequence $\underline{q}_k^{RI}$ is formed by:

```
set i, k to 0
    while i < Q_RI
        if N = 1,
            q_k^RI = [q_i^RI ...q_{i+Q_m-1}^RI]^T
        elseif N = 2,
            q_k^RI = [q_i^RI ...q_{i+Q_m-1}^RI q_i^RI ...q_{i+Q_m-1}^RI]^T
        end if
        i = i + Q_m · N
        k = k + 1
    end while,
``` where $Q_{RI}$ denotes a number of total bits of coded RI information.

12. The method in accordance with claim 2, wherein channel quality information (CQI) is transmitted in the one or more MIMO coded transport blocks using a vector sequence $\underline{g}_k$ formed by:

```
set i, j, k to 0
    while j < Q_CQI
        k = k + 1
    end while,
    while i < G
        k = k + 1
    end while,
``` where $Q_{CQI}$ denotes a number of total bits of the coded CQI, $q_j$ denotes a bit of coded CQI, $f_i$ denotes a bit of coded data, G denotes a total number of coded data bits, and $\underline{g}_k$ denotes an output of a data and control information multiplexing operation.

13. A subscriber station, comprising:
a transmit path circuitry configured to transmit one or more multiple-input multiple-output (MIMO) uplink coded transport blocks to a base station on a number $N_L$ of layers, the coded transport blocks comprising:
a vector sequence $\underline{q}_k^{ACK}$ carrying acknowledgement/negative acknowledgement (ACK/NACK) information and comprising $N_L Q_m$ bits formed using a sequence $q_i^{ACK} \ldots q_{i+Q_m-1}^{ACK}$ of information repeated $N_L$ times, where $Q_m$ is a number of bits per symbol and $q_{ACK}$ denotes a bit of coded ACK/NACK information,
a vector sequence $\underline{q}_k^{RI}$ carrying rank indication (RI) information and comprising $N_L Q_m$ bits formed using a sequence $q_i^{RI} \ldots q_{i+Q_m-1}^{RI}$ of information repeated $N_L$ times, where $q^{RI}$ denotes a bit of coded RI information, and
a vector sequence $\underline{g}_k$ carrying channel quality information (CQI).

14. The subscriber station in accordance with claim 3, wherein the vector sequence $\underline{q}_k^{ACK}$ is formed by:

```
set i, k to 0
    while i < Q_ACK
        if N = 1,
            q_k^ACK = [q_i^ACK ...q_{i+Q_m-1}^ACK]^T
        elseif N = 2,
            q_k^ACK = [q_i^ACK ...q_{i+Q_m-1}^ACK q_i^ACK ...q_{i+Q_m-1}^ACK]^T
        end if
        i = i + Q_m · N
        k = k + 1
    end while,
``` where $Q_{ACK}$ denotes a number of total bits of coded ACK/NACK information.

15. The subscriber station in accordance with claim 3, wherein the vector sequence $\underline{q}_k^{RI}$ is formed by:

```
set i, k to 0
    while i < Q_RI
        if N = 1,
            q_k^RI = [q_i^RI ...q_{i+Q_m-1}^RI]^T
        elseif N = 2,
            q_k^RI = [q_i^RI ...q_{i+Q_m-1}^RI q_i^RI ...q_{i+Q_m-1}^RI]^T
        end if
        i = i + Q_m · N
        k = k + 1
    end while,
``` where $Q_{RI}$ denotes a number of total bits of coded RI information.

16. The subscriber station in accordance with claim 13, wherein channel quality information (CQI) is transmitted in the one or more MIMO coded transport blocks using a vector sequence $\underline{g}_k$ formed by:

```
set i, j, k to 0
    while j < Q_CQI
        k = k + 1
    end while,
    while i < G
        k = k + 1
    end while,
``` where $Q_{CQI}$ denotes a number of total bits of coded CQI, $q_j$ denotes a bit of coded CQI, $f_i$ denotes a bit of coded data, G denotes a total number of coded data bits, and $\underline{g}_k$ denotes an output of a data and control information multiplexing operation.

17. A method of operating a subscriber station, the method comprising:
transmitting one or more multiple-input multiple-output (MIMO) uplink coded transport blocks from a subscriber station on a number $N_L$ of layers, the coded transport blocks comprising:
a vector sequence $\underline{q}_k^{ACK}$ carrying acknowledgement/negative acknowledgement (ACK/NACK) information and comprising $N_L Q_m$ bits formed using a sequence $q_i^{ACK} \ldots q_{i+Q_m-1}^{ACK}$ of information repeated $N_L$ times, where $Q_m$ is a number of bits per symbol and $q^{ACK}$ denotes a bit of coded ACK/NACK information,
a vector sequence $\underline{q}_k^{RI}$ carrying rank indication (RI) information and comprising $N_L Q_m$ bits formed using a sequence $q_i^{RI} \ldots q_{i+Q_m-1}^{RI}$ of information repeated $N_L$ times, where $q^{RI}$ denotes a bit of coded RI information, and a vector sequence $\underline{g}_k$ carrying channel quality information (CQI).

18. The method in accordance with claim 4, wherein the vector sequence $\underline{q}_k^{ACK}$ is formed by:

```
set i, k to 0
    while i < Q_ACK
        if N = 1,
            q_k^ACK = [q_i^ACK ...q_{i+Q_m-1}^ACK]^T
        elseif N = 2,
            q_k^ACK = [q_i^ACK ...q_{i+Q_m-1}^ACK q_i^ACK ...q_{i+Q_m-1}^ACK]^T
        end if
        i = i + Q_m · N
        k = k + 1
    end while,
``` where $Q_{ACK}$ denotes a number of total bits of coded ACK/NACK information.

19. The method in accordance with claim 4, wherein the vector sequence $\underline{q}_k^{RI}$ is formed by:

```
set i, k to 0
    while i < Q_RI
        if N = 1,
            q_k^RI = [q_i^RI ...q_{i+Q_m-1}^RI]^T
        elseif N = 2,
            q_k^RI = [q_i^RI ...q_{i+Q_m-1}^RI q_i^RI ...q_{i+Q_m-1}^RI]^T
        end if
        i = i + Q_m · N
        k = k + 1
    end while,
``` where $Q_{RI}$ denotes a number of total bits of coded RI information.

20. The method in accordance with claim 4, wherein channel quality information (CQI) is transmitted in the one or more MIMO coded transport blocks using a vector sequence $\underline{g}_k$ formed by:

```
set i, j, k to 0
    while j < Q_CQI
        k = k + 1
    end while,
    while i < G
        k = k + 1
    end while,
``` where $Q_{CQI}$ denotes a number of total bits of coded CQI, $q_j$ denotes a bit of coded CQI, $f_i$ denotes a bit of coded data, G denotes a total number of coded data bits, and $\underline{g}_k$ denotes an output of a data and control information multiplexing operation.

* * * * *